United States Patent
Ahn et al.

(10) Patent No.: US 10,581,582 B2
(45) Date of Patent: Mar. 3, 2020

(54) WIRELESS COMMUNICATION METHOD AND WIRELESS COMMUNICATION DEVICE FOR CONFIGURING BROADBAND LINK

(71) Applicant: WILUS INSTITUTE OF STANDARDS AND TECHNOLOGY INC., Seoul (KR)

(72) Inventors: Jinsoo Ahn, Seoul (KR); Yongho Kim, Incheon (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

(21) Appl. No.: 15/523,672

(22) PCT Filed: Oct. 29, 2015

(86) PCT No.: PCT/KR2015/011511
§ 371 (c)(1),
(2) Date: May 1, 2017

(87) PCT Pub. No.: WO2016/068624
PCT Pub. Date: May 6, 2016

(65) Prior Publication Data
US 2017/0338935 A1    Nov. 23, 2017

(30) Foreign Application Priority Data

Oct. 29, 2014  (KR) .................. 10-2014-0148477
Oct. 31, 2014  (KR) .................. 10-2014-0150730
(Continued)

(51) Int. Cl.
*H04J 3/18*      (2006.01)
*H04L 5/00*      (2006.01)
(Continued)

(52) U.S. Cl.
CPC ....... *H04L 5/0064* (2013.01); *H04W 72/0446* (2013.01); *H04W 74/0816* (2013.01)

(58) Field of Classification Search
CPC .......... H04W 72/0446; H04W 74/0816; H04L 5/0064
See application file for complete search history.

(56) References Cited

U.S. PATENT DOCUMENTS 8,634,317 B1  1/2014  Yu
9,264,908 B2 *  2/2016  Park ..................... H04W 16/14
(Continued)

FOREIGN PATENT DOCUMENTS

KR  10-2004-0055517  6/2004
KR  10-2004-0083787  10/2004
(Continued)

OTHER PUBLICATIONS

International Search Report for PCT/KR2015/011511 dated Mar. 31, 2016 and its English translation from WIPO.
(Continued)

*Primary Examiner* — Abdelnabi O Musa
(74) *Attorney, Agent, or Firm* — Ladas & Parry, LLP

(57) ABSTRACT

The present invention relates to a wireless communication method and a wireless communication terminal for wideband link setup, and more particularly, a wireless communication method and a wireless communication terminal for increasing data communication efficiency by extending a data transmission bandwidth of a terminal. To this end, provided are a wireless communication terminal, the terminal comprising: a transceiver configured to transmit and
(Continued)

receive a wireless signal; and a processor configured to control an operation of the wireless communication terminal, wherein the processor is configured to: obtain basic primary channel information of a basic service set (BSS) with which the terminal is associated, obtain alternative primary channel information set for the terminal, wherein the alternative primary channel is set among at least one of secondary channels of the BSS, and perform communication using at least one of the basic primary channel and the alternative primary channel, and a wireless communication method using the same.

8 Claims, 43 Drawing Sheets

(30) Foreign Application Priority Data

Dec. 4, 2014 (KR) .................. 10-2014-0173419
Jan. 8, 2015 (KR) .................. 10-2015-0002951

(51) Int. Cl.
*H04W 72/04* (2009.01)
*H04W 74/08* (2009.01)

(56) References Cited

U.S. PATENT DOCUMENTS

| | | | |
|---|---|---|---|
| 2008/0316955 A1 | 12/2008 | Yu | |
| 2012/0213204 A1* | 8/2012 | Noh | H04W 72/02 |
| | | | 370/331 |
| 2014/0241257 A1 | 8/2014 | Ding et al. | |
| 2014/0328195 A1 | 11/2014 | Sampath et al. | |
| 2014/0355534 A1* | 12/2014 | Vermani | H04W 16/14 |
| | | | 370/329 |
| 2015/0373685 A1* | 12/2015 | Seok | H04W 74/002 |
| | | | 370/329 |
| 2016/0081010 A1* | 3/2016 | Seok | H04W 74/0816 |
| | | | 370/329 |
| 2016/0174079 A1 | 6/2016 | Wang et al. | |
| 2017/0202019 A1* | 7/2017 | You | H04W 16/14 |

FOREIGN PATENT DOCUMENTS

| | | |
|---|---|---|
| KR | 10-2010-0004039 | 1/2010 |
| WO | 2014/112707 | 7/2014 |
| WO | 2014/123349 | 8/2014 |

OTHER PUBLICATIONS

Written Opinion of the International Searching Authority for PCT/KR2015/011511 dated Mar. 31, 2016 and its English translation from WIPO.

International Preliminary Report on Patentability (Chapter I) for PCT/KR2015/011511 dated May 2, 2017 and its English translation from WIPO.

Office Action dated Jun. 25, 2018 for U.S. Appl. No. 15/313,105 (Published as US 2017/0188336).

Final Office Action dated Mar. 19, 2019 for U.S. Appl. No. 15/313,105 (Published as US 2017/0188336).

Advisory Action dated Jul. 1, 2019 for U.S. Appl. No. 15/313,105 (Published as US 2017/0188336).

* cited by examiner

WIRELESS COMMUNICATION METHOD AND WIRELESS COMMUNICATION DEVICE FOR CONFIGURING BROADBAND LINK

CROSS-REFERENCE TO RELATED APPLICATIONS

This application is the U.S. National Stage of International Patent Application No. PCT/KR2015/011511 filed on Oct. 29, 2015, which claims the priority to Korean Patent Application No. 10-2014-0148477 filed in the Korean Intellectual Property Office on Oct. 29, 2014, Korean Patent Application No. 10-2014-0150730 filed in the Korean Intellectual Property Office on Oct. 31, 2014, Korean Patent Application No. 10-2014-0173419 filed in the Korean Intellectual Property Office on Dec. 4, 2014, and Korean Patent Application No. 10-2015-0002951 filed in the Korean Intellectual Property Office on Jan. 8, 2015, the entire contents of which are incorporated herein by reference.

TECHNICAL FIELD

The present invention relates to a wireless communication method and a wireless communication terminal for configuring wideband link, and more particularly, to a wireless communication method and a wireless communication terminal for increasing data communication efficiency by extending a data transmission bandwidth of a terminal.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has been made in an effort to provide a high-efficiency/high-performance wireless LAN communication in a high-density environment.

In particular, the present invention has been made in an effort to provide a method for allocating a wideband channel for transmitting data in order to improve communication efficiency.

Technical Solution

In order to achieve the objects, the present invention provides a wireless communication method and a wireless communication terminal as below.

First, an exemplary embodiment of the present invention provides a wireless communication method of a terminal, including: a transceiver transmitting and receiving a wireless signal; and a processor controlling an operation of the terminal, wherein the processor obtains first primary channel information of a basic service set (BSS) with which the terminal is associated, obtains second primary channel information set for the terminal, in which the second primary channel is set among at least one of the secondary channels of the BSS, performs a backoff procedure for the first primary channel, performs clear channel assessment (CCA) for the second primary channel for a predetermined time before a backoff counter of the backoff procedure expires and transmits data by using both the first primary channel and the second primary channel when the second primary channel is idle as a result of performing the CCA.

In addition, another exemplary embodiment of the present invention provides a wireless communication method of a terminal, including: obtaining first primary channel information of a basic service set (BSS) with which the terminal is associated; obtaining second primary channel information set for the terminal, the second primary channel being set among at least one of the secondary channels of the BSS; performing a backoff procedure for the first primary channel; performing clear channel assessment (CCA) for the second primary channel for a predetermined time before a backoff counter of the backoff procedure expires; and transmitting data by using both the first primary channel and the second primary channel when the second primary channel is idle as a result of performing the CCA.

In this case, the processor may further perform a clear channel assessment (CCA) for secondary channels of the BSS for a predetermined time before the backoff counter of the backoff procedure expires and when the second primary channel is idle and at least one idle secondary channel which can be aggregated with the second primary channel is present as a result of performing the CCA, the processor may transmit the data through a wideband channel in which the second primary channel and the idle secondary channel are aggregated with each other.

Next, yet another exemplary embodiment of the present invention provides a wireless communication terminal including: a transceiver transmitting and receiving a wireless signal; and a processor controlling an operation of the terminal, wherein the processor obtains first primary channel information of a basic service set (BSS) with which the terminal is associated, obtains second primary channel information set for the terminal, in which the second primary channel is set among at least one of the secondary channels of the BSS, performs a backoff procedure for each of the first primary channel and the second primary channel and transmits data by using at least one channel between the first primary channel and the second primary channel in which a backoff counter of the backoff procedure expires.

In addition, yet another exemplary embodiment of the present invention provides a wireless communication method of a terminal, including: obtaining first primary channel information of a basic service set (BSS) with which the terminal is associated; obtaining second primary channel information set for the terminal, the second primary channel being set among at least one of the secondary channels of the BSS; performing a backoff procedure for each of the first primary channel and the second primary channel; and transmitting data by using at least one channel between the first primary channel and the second primary channel in which a backoff counter of the backoff procedure expires.

According to an exemplary embodiment, a second backoff counter for the backoff procedure of the second primary channel may be set equal to a first backoff counter for the backoff procedure of the first primary channel.

In this case, when the backoff procedure of the first primary channel is suspended, the backoff procedure of the second primary channel may be simultaneously suspended during the suspension period of the backoff procedure of the first primary channel and when the second primary channel is continuously maintained to be idle while the backoff procedure of the first primary channel is performed, the data may be transmitted by using the second primary channel.

According to another exemplary embodiment, each of a first backoff counter for the backoff procedure of the first primary channel and a second backoff counter for the backoff procedure of the second primary channel may be set independently from each other.

In this case, when the second backoff counter expires earlier than the first backoff counter, the processor may defer transmitting the data by using the second primary channel until the first backoff counter expires and when the first backoff counter expires, the processor may transmit the data by using both the first primary channel and the second primary channel.

According to yet another exemplary embodiment, the backoff procedure of the first primary channel and the backoff procedure of the second primary channel may be performed by using a common backoff counter, and the common backoff counter may be suspended when both the first primary channel and the second primary channel are busy.

In this case, when the common backoff counter expires, the processor may transmit the data by using at least one channel between the first primary channel and the second primary channel which is idle.

According to the exemplary embodiment, the processor may further perform the clear channel assessment (CCA) for secondary channels of the BSS for a predetermined time before the backoff counter of the backoff procedure of the second primary channel expires and when at least one idle secondary channel which can be aggregated with the second primary channel is present as a result of performing the CCA, the processor may transmit the data through a wideband channel in which the second primary channel and the idle secondary channel are aggregated with each other.

Still yet another exemplary embodiment of the present invention provides a base wireless communication terminal, the terminal being associated with at least one station, the terminal including: a transceiver configured to transmit and receive a wireless signal; and a processor configured to control an operation of the base wireless communication terminal, wherein the processor sets a first primary channel to be used by the terminal and stations associated with the terminal, allocates at least one second primary channel to each station of multiple users, wherein the second primary channel is set independently for the each station, and performs multi-user transmission for at least one station using the first primary channel and the at least one second primary channel.

In addition, still yet another exemplary embodiment of the present invention provides a wireless communication method of a base wireless communication terminal, the terminal being associated with at least one station, the method including: setting a first primary channel to be used by the terminal and stations associated with the terminal; allocating at least one second primary channel to each station of multiple users, wherein the second primary channel is set independently for the each station; and performing multi-user transmission for at least one station using the first primary channel and the at least one second primary channel.

In this case, the processor may perform backoff procedures for each of the first primary channel and the at least one second primary channel, and perform the multi-user transmission based on the backoff procedures.

In addition, the backoff procedures for the first primary channel and the at least one second primary channel may be performed using a common backoff counter.

According to an embodiment, the processor may suspend the backoff procedure using the common backoff counter when both the first primary channel and the at least one second primary channel are busy, and proceed the backoff procedure using the common backoff counter when at least one of the first primary channel and the at least one second primary channel is idle.

According to another embodiment, the processor may suspend the backoff procedure using the common backoff counter when at least one of the first primary channel and the at least one second primary channel is busy, and proceed the backoff procedure using the common backoff counter when both the first primary channel and the at least one second primary channel are idle.

In this case, the processor may perform the multi-user transmission using the first primary channel and the at least one second primary channel that are idle when the common backoff counter of the backoff procedure expires.

In addition, a first backoff counter for the backoff procedure of the first primary channel and a second backoff counter for the backoff procedure of the second primary channel may be set independently.

In addition, the processor may defer data transmission using the second primary channel in a ready state until expiration of the first backoff counter when the second backoff counter expires prior to the first backoff counter, and perform the multi-user transmission using the first primary channel and the second channel in the ready state together when the first backoff counter expires.

In addition, the processor may transmit a multi-user control frame to the at least one station through the at least one second primary channel.

In addition, the multi-user control frame may include indicator information on a specific channel for performing data transmission to a target station of the multi-user transmission.

Next, still yet another exemplary embodiment of the present invention provides a wireless communication terminal, the terminal including: a transceiver configured to transmit and receive a wireless signal; and a processor configured to control an operation of the wireless communication terminal, wherein the processor obtains basic primary channel information of a basic service set (BSS) with which the terminal is associated, obtains alternative primary channel information set for the terminal, wherein the alternative primary channel is set among at least one of secondary channels of the BSS, and performs communication using at least one of the basic primary channel and the alternative primary channel.

In addition, still yet another exemplary embodiment of the present invention provides a wireless communication method of a terminal, the method including: obtaining basic primary channel information of a basic service set (BSS) with which the terminal is associated; obtaining alternative primary channel information set for the terminal, wherein the alternative primary channel is set among at least one of secondary channels of the BSS; and performing communication using at least one of the basic primary channel and the alternative primary channel.

In this case, the processor may transmit and receive a control frame and a data frame using both the basic primary channel and the alternative primary channel.

In this case, the control frame may include at least one of an RTS frame, a CTS frame, an ACK frame, a PS-poll frame, and a multi-user uplink transmission trigger frame.

In addition, the processor may perform data transmission and reception selectively using the basic primary channel and the alternative primary channel.

In this case, the processor may receive an alternative primary channel indicator through the basic primary channel, and switch a using channel of the terminal from the basic primary channel to the alternative primary channel in response to the reception of the alternative primary channel indicator.

In this case, the alternative primary channel indicator may include alternative primary channel duration information set for the terminal to use the alternative primary channel.

In addition, the processor may perform data transmission and reception using the alternative primary channel during the alternative primary channel duration, and when the alternative primary channel duration expires, suspend using of the alternative primary channel and switch the using channel to the basic primary channel.

In addition, the alternative primary channel duration may be determined based on a time obtained by subtracting a time required for transmitting a beacon from a beacon transmission interval of a base wireless communication terminal.

In addition, the processor may transmit and receive a control frame and a data frame using the alternative primary channel, and receive a beacon by periodically switching to the basic primary channel for each beacon transmission interval of the base wireless communication terminal Next, still yet another exemplary embodiment of the present invention provides a base wireless communication terminal, the terminal being associated with at least one station, the terminal including: a transceiver configured to transmit and receive a wireless signal; and a processor configured to control an operation of the base wireless communication terminal, wherein the processor sets a first primary channel to be used by the terminal and stations associated with the terminal, allocates at least one second primary channel to each station of multiple users, wherein the second primary channel is set independently for the each station, and transmits a message triggering the each station to use the allocated second primary channel.

In addition, still yet another exemplary embodiment of the present invention provides a wireless communication method of a base wireless communication terminal, the terminal being associated with at least one station, the method including: setting a first primary channel to be used by the terminal and stations associated with the terminal; allocating at least one second primary channel to each station of multiple users, wherein the second primary channel is set independently for the each station; and transmitting a message triggering the each station to use the allocated second primary channel.

In this case, the triggering message may comprise alternative primary channel information allocated for the each station.

In addition, the processor may transmit a resource indicator for allocating a transmission channel of stations to which the alternative primary channel is allocated.

In addition, the resource indicator may indicate at least one of a specific channel of a 20 MHz band, a specific subband channel below a 20 MHz band, and a specific channel group of a 20 MHz band or more.

In addition, the processor may transmit a control frame for guaranteeing a multi-user transmission opportunity before transmitting the resource indicator.

According to an embodiment, the control frame may be an RTS-to-self frame.

In addition, the processor may receive a resource allocation identification frame of each station corresponding to the resource indicator, and transmit data through a channel allocated to each station in response to the reception of the resource allocation identification frame.

According to an embodiment, the resource allocation identification frame may be a CTS frame.

According to an embodiment, the resource allocation identification frame of a station, allocated with a subband channel as the transmission channel, may be a cascade CTS frame consist of CTS frames sequentially transmitted by a plurality of stations.

According to another embodiment, the resource allocation identification frame of a station, allocated with a subband channel as the transmission channel, may be a subband CTS frame transmitted through a corresponding subband channel.

Advantageous Effects

According to embodiments of the present invention, an environment in which a terminal can use a wideband channel is provided by various methods to increase a data transmission speed of the terminal.

According to the embodiments of the present invention, a bandwidth is extended by using a separately allocated alternative primary channel in addition to a primary channel allocated to a BSS in the related art to increase the overall channel use rate.

According to the embodiments of the present invention, it is possible to increase the overall resource utilization in a contention based channel access system and improve the performance of the wireless LAN system.

In addition, according to the embodiment of the present invention, the signal processing efficiency for multi-user control of the wireless LAN system can be improved.

Also, according to the embodiment of the present invention, it is possible to minimize a transmission failure probability in an alternative primary channel based OFDMA environment using a wideband channel with multiple users.

Also, according to the embodiment of the present invention, the overhead of transmitting control frames can be reduced since the control frames required for multi-user support are distributed and transmitted over the alternative primary channel.

Also, each embodiment of the present invention can reduce the implementation complexity by using a frame type used in the existing legacy wireless LAN system.

BEST MODE

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2014-0148477, 10-2014-0150730, 10-2014-0173419 and 10-2015-0002951 filed in the Korean Intellectual Property Office and the embodiments and mentioned items described in the respective application, which forms the basis of the priority, shall be included in the Detailed Description of the present application.

Figure 1:
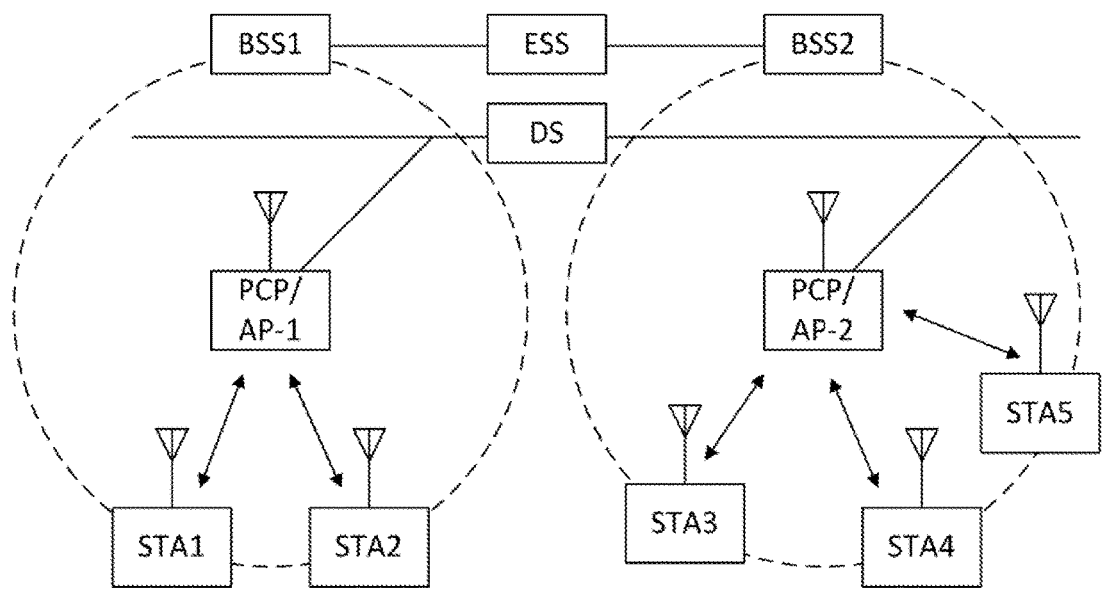
FIG. 1 is a diagram illustrating a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
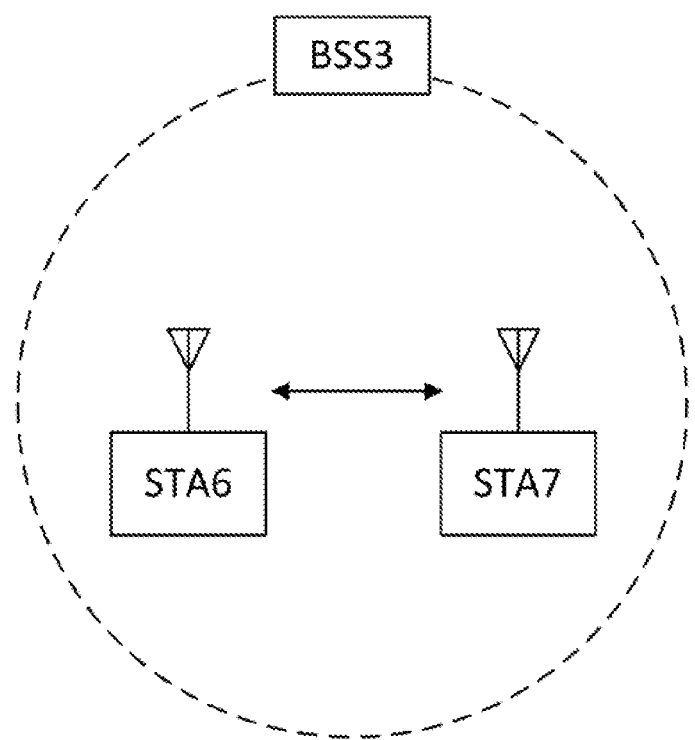
FIG. 2 is a diagram illustrating a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
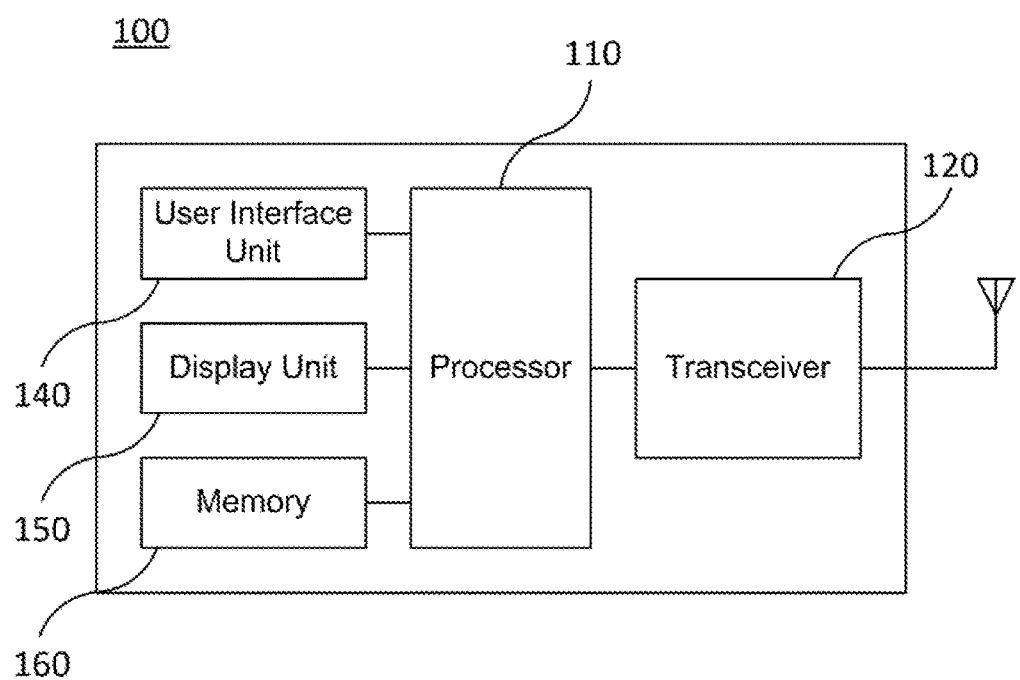
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
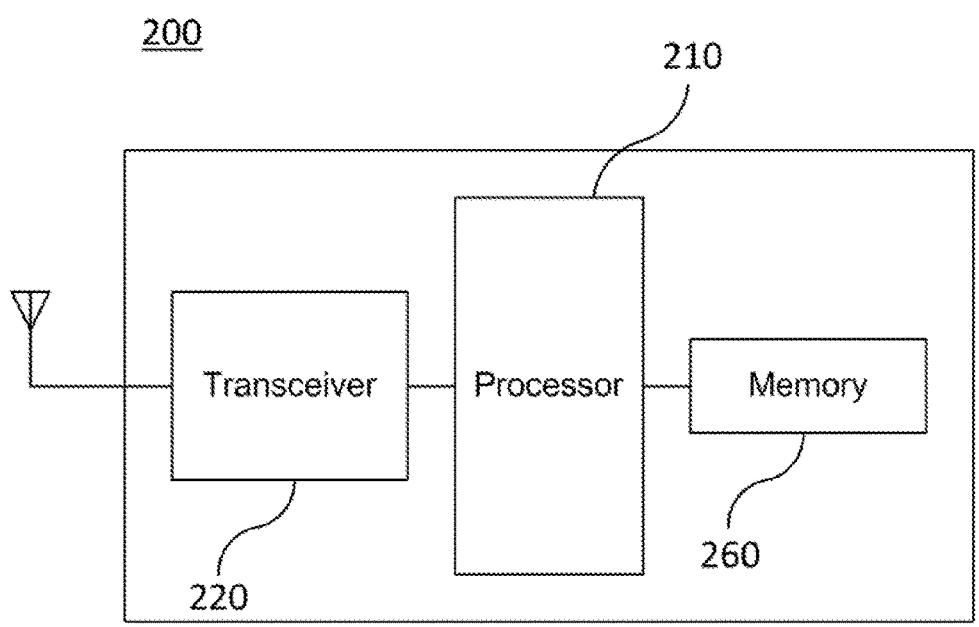
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as wireless signal transmission/reception of the AP 200 according to the embodiment of the present invention. A detailed embodiment thereof will be described below.

Figure 5:
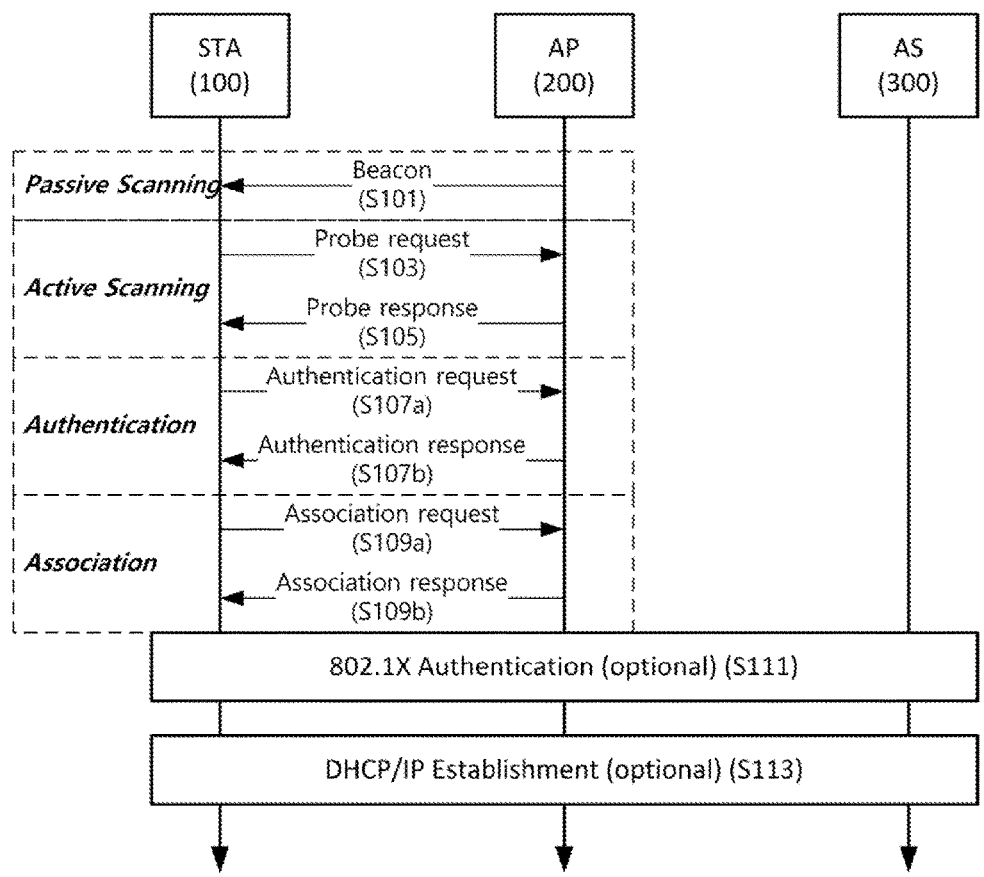
FIG. 5 is a diagram schematically illustrating a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
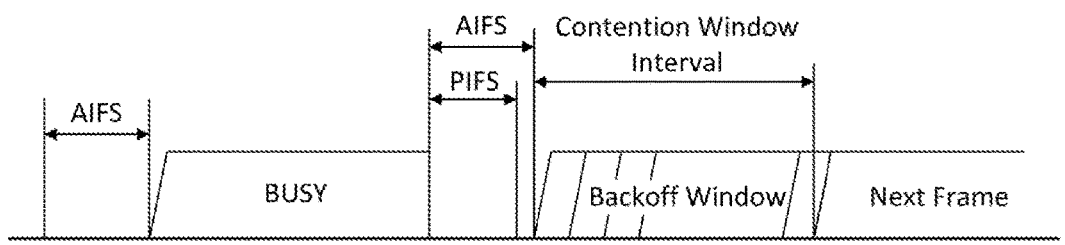
FIG. 6 is a diagram illustrating a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an interframe space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number assigned to the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Figure 7:
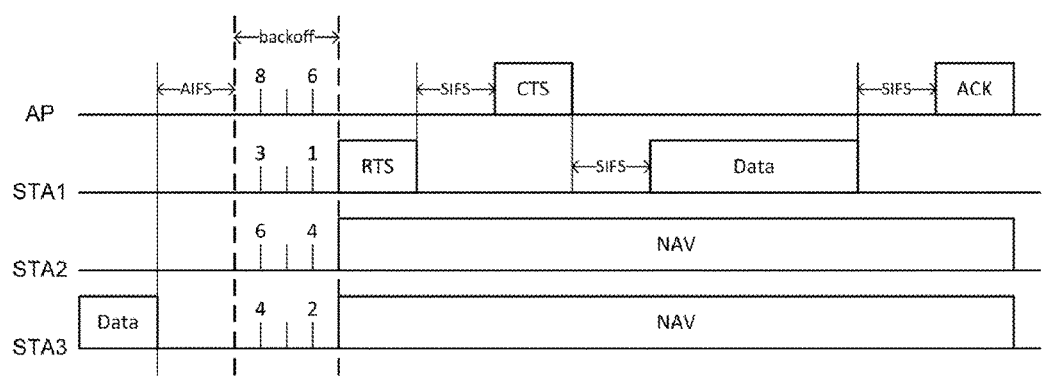
FIG. 7 is a diagram illustrating a method for performing a distributed coordination function (DCF) using a request to send (RTS) frame and a clear to send (CTS) frame.

FIG. 7 is a diagram illustrating a method for performing a distributed coordination function using a request to send (RTS) frame and a clear to send (CTS) frame.

The AP and STAs in the BSS contend in order to obtain an authority for transmitting data. When data transmission at the previous step is completed, each terminal having data to be transmitted performs a backoff procedure while decreasing a backoff counter (alternatively, a backoff timer) of a random number allocated to each terminal after an AFIS time. A transmitting terminal in which the backoff counter expires transmits the request to send (RTS) frame to notify that corresponding terminal has data to transmit. According to an exemplary embodiment of FIG. 7, STA1 which holds a lead in contention with minimum backoff may transmit the RTS frame after the backoff counter expires. The RTS frame includes information on a receiver address, a transmitter address, and duration. A receiving terminal (i.e., the AP in FIG. 7) that receives the RTS frame transmits the clear to send (CTS) frame after waiting for a short IFS (SIFS) time to notify that the data transmission is available to the transmitting terminal STA1. The CTS frame includes the information on a receiver address and duration. In this case, the receiver address of the CTS frame may be set identically to a transmitter address of the RTS frame corresponding thereto, that is, an address of the transmitting terminal STA1.

The transmitting terminal STA1 that receives the CTS frame transmits the data after a SIFS time. When the data transmission is completed, the receiving terminal AP transmits an acknowledgment (ACK) frame after a SIFS time to notify that the data transmission is completed. When the transmitting terminal receives the ACK frame within a predetermined time, the transmitting terminal regards that the data transmission is successful. However, when the transmitting terminal does not receive the ACK frame within the predetermined time, the transmitting terminal regards that the data transmission is failed. Meanwhile, adjacent terminals that receive at least one of the RTS frame and the CTS frame in the course of the transmission procedure set a network allocation vector (NAV) and do not perform data transmission until the set NAV is terminated. In this case, the NAV of each terminal may be set based on a duration field of the received RTS frame or CTS frame.

In the course of the aforementioned data transmission procedure, when the RTS frame or CTS frame of the terminals is not normally transferred to a target terminal (i.e., a terminal of the receiver address) due to a situation such as interference or a collision, a subsequent process is suspended. The transmitting terminal STA1 that transmitted the RTS frame regards that the data transmission is unavailable and participates in a next contention by being allocated with a new random number. In this case, the newly allocated random number may be determined within a range (2*CW) twice larger than a previous predetermined random number range (a contention window, CW).

Figure 8:
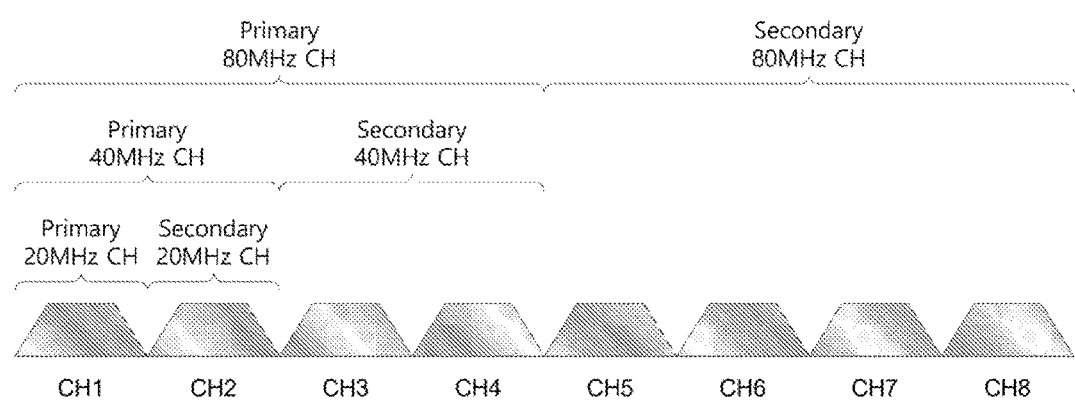
FIG. 8 is a diagram illustrating a wideband allocation method for wireless LAN communication.

FIG. 8 illustrates a wideband allocation method for wireless LAN communication. In FIG. 8 and drawings given below, CH1 to CH8 represent 20 MHz channels, respectively, but the number of channels and a bandwidth of the channels may be changed according to a communication scheme to which the present invention is applied.

In the wireless LAN system, the terminals of each BSS perform communication by setting a specific channel as a primary channel. The primary channel is a channel used for non-AP STAs to be associated with the AP and may be extended to 40 MHz, 80 MHz, and the like from basic 20 MHz according to a transmission bandwidth. Meanwhile, a secondary channel is an adjacent channel having the same bandwidth as the primary channel and forms a channel having a double bandwidth in aggregation with the primary channel.

The terminals of the BSS perform clear channel assessment (CCA) with respect to each channel to check whether the corresponding channel is busy and perform bandwidth extension based on channel(s) determined to be idle. That is, by using 20 MHz as a basic bandwidth, the terminal may extend the transmission bandwidth to 40 MHz, 80 MHz, and 160 MHz by considering whether channels adjacent to the primary channel are idle.

In more detail, referring to FIG. 8, CH1 may be set as a primary 20 MHz channel of the BSS and a total 40 MHz transmission bandwidth having CH1 and CH2 as the primary channel and the secondary channel, respectively may be used when CH2 adjacent to CH1 is idle. Further, when both CH3 and CH4 adjacent to CH1 and CH2 are idle, a total 80 MHz transmission bandwidth having CH1 and CH2 as a primary 40 MHz channel and having CH3 and CH4 as a secondary 40 MHz channel may be used. Similarly, when all of CH5 to CH8 adjacent to CH1 to CH4 are idle, a total 160 MHz transmission bandwidth having CH1 to CH4 as a primary 80 MHz channel and having CH5 to CH8 as a secondary 80 MHz channel may be used.

Figure 9:
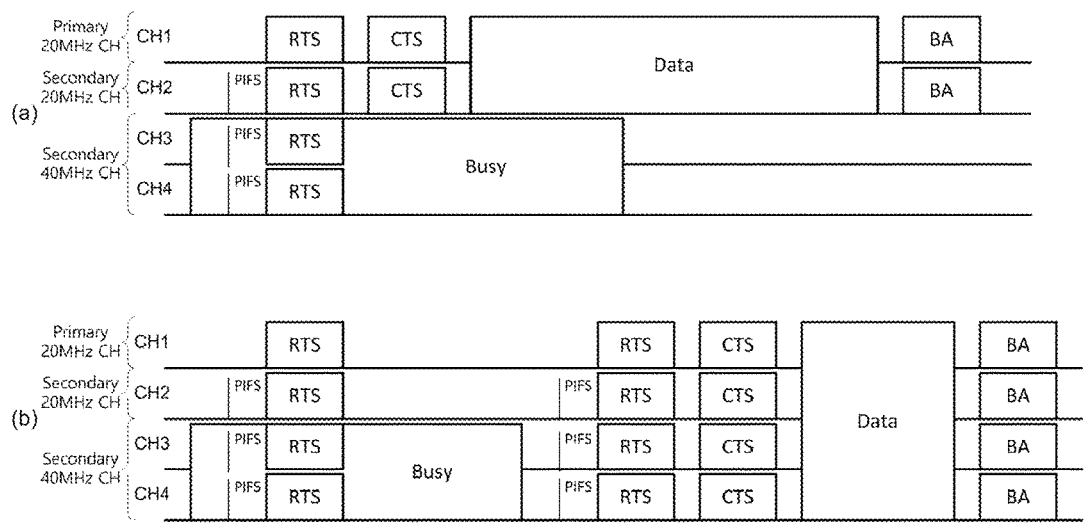
FIG. 9 is a diagram illustrating an exemplary embodiment of a wideband access method of a terminal.

FIG. 9 illustrates a wideband access method of a terminal using a request to send (RTS) frame and a clear to send (CTS) frame. In the exemplary embodiment of FIG. 9, a maximum bandwidth is set to 80 MHz in the corresponding BSS. Further, as described above in FIG. 7, the terminal performs a backoff procedure for the primary channel (CH1) and when a backoff counter expires the terminal transmits RTS frames to channels (CH1 to CH4) of 80 MHz bandwidth, which include the primary channel and the secondary channels.

First, FIG. 9(a) illustrates a wideband access method according to a dynamic bandwidth operation. Referring to FIG. 9(a), the terminal transmits the RTS frames to each of the channels CH1 to CH4 of 80 MHz bandwidth, but CTS frames are received only in CH1 and CH2 since secondary 40 MHz channels CH3 and CH4 are busy. Therefore, the terminal transmits data by using a partial bandwidth of 40 MHz as the transmission bandwidth. In this case, the transmission bandwidth has CH1 and CH2 in which the CTS frame is received as the primary channel and the secondary channel, respectively. Meanwhile, the corresponding terminal may not use CH3 and CH4 in which the CTS frame is not received until a next backoff procedure for the primary channel CH1 is performed. That is, according to the exemplary embodiment of FIG. 9(a), the terminal transmits data by using the maximum bandwidth when the primary channel and all secondary channels are idle. Further, the terminal transmits data by using only a partial bandwidth including the primary channel when at least some of secondary channels are busy.

Next, FIG. 9(b) illustrates a wideband access method according to a static bandwidth operation. Referring to FIG. 9(b), the terminal transmits the RTS frames to each of the channels CH1 to CH4 of 80 MHz bandwidth, but CTS frames are not received through some channels CH3 and CH4 since the CH3 and CH4 are busy. Accordingly, the terminal postpones using all channels CH1 to CH4 of 80 MHz bandwidth and transmits the RTS frames for four channels again after the next backoff procedure. That is, according to the exemplary embodiment of FIG. 9(b), when at least one channel among all channels of the maximum bandwidth is busy, the terminal does not use the total bandwidth and performs a backoff procedure again for the primary channel in order to transmit data.

Figure 10:
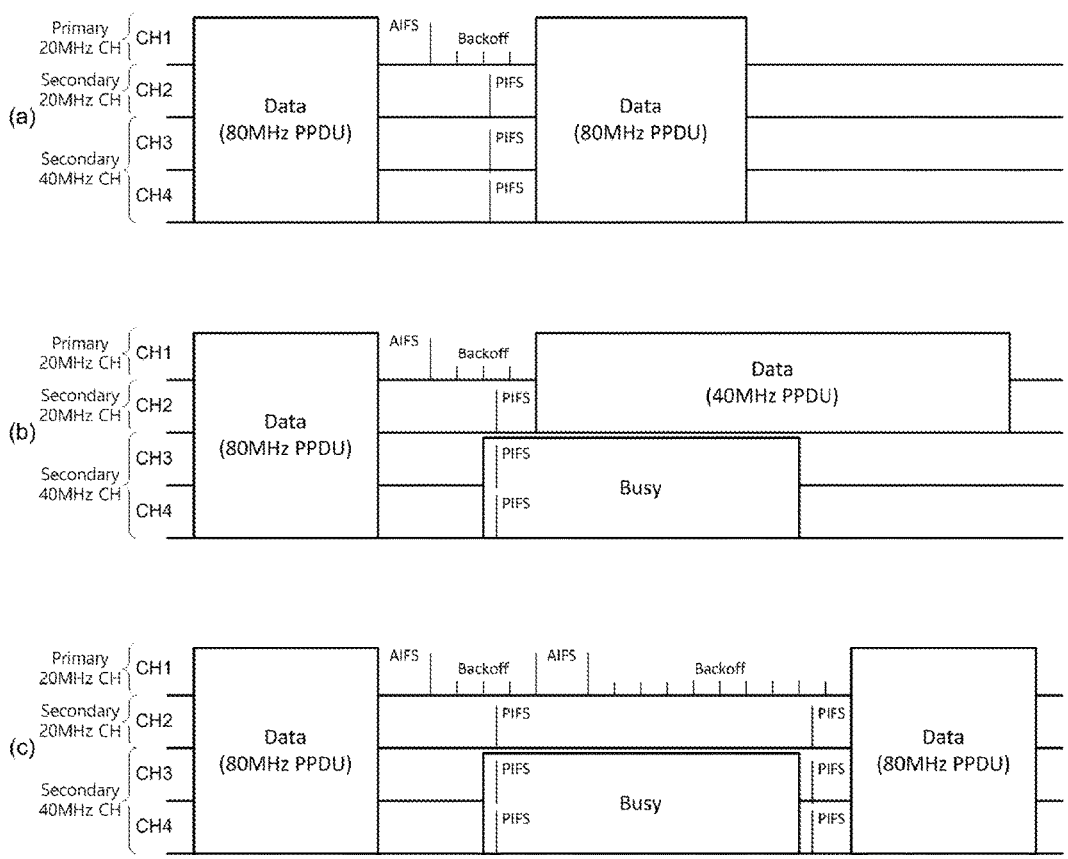
FIG. 10 is a diagram illustrating another exemplary embodiment of a wideband access method of a terminal.

FIG. 10 illustrates another exemplary embodiment of a wideband access method of a terminal. Even in the exemplary embodiment of FIG. 10, the maximum bandwidth is set to 80 MHz in the corresponding BSS and duplicated description with the exemplary embodiment of FIG. 9 will be omitted.

FIG. 10(a) illustrates an exemplary embodiment in which data is successfully transmitted by using the set maximum bandwidth, and FIGS. 10(b) and 10(c) illustrate exemplary embodiments of data transmission in which some channels of the maximum bandwidth are busy. In more detail, FIG. 10(b) illustrates the wideband access method according to the dynamic bandwidth operation and when the secondary 40 MHz channels CH3 and CH4 are busy, the terminal transmits data by using only the primary 40 MHz channels CH1 and CH2. Next, FIG. 10(c) illustrates the wideband access method according to the static bandwidth operation and when at least some channels are busy, the terminal does not transmit data and defers by performing a backoff procedure until the maximum bandwidth of 80 MHz is totally usable.

Meanwhile, in each exemplary embodiment of FIG. 10, the backoff procedure and enhanced distributed coordination access (EDCA) are performed only in the primary 20 MHz channel CH1 and in other secondary channels CH2 to CH4, it may be verified whether the corresponding channel is usable through CCA for a PIFS time before the backoff counter expires.

Figure 11:
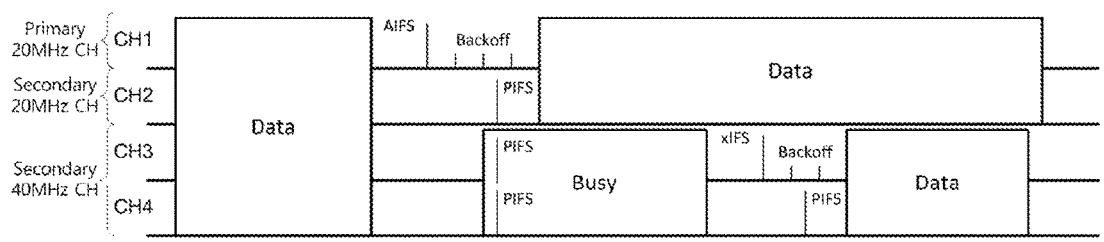
FIG. 11 is a diagram illustrating yet another exemplary embodiment of a wideband access method of a terminal.

FIG. 11 illustrates yet another exemplary embodiment of a wideband access method of a terminal. In the previous exemplary embodiments, the terminal that transmits the data uses initially set channel(s) until the corresponding transmission ends, but in the exemplary embodiment of FIG. 11, when a channel which is additionally usable is sensed while transmitting the data, the terminal may use the corresponding channel.

In more detail, the terminal performs a backoff procedure for the primary channel CH1 and verifies, in other secondary channels CH2 to CH4, whether each channel is usable by performing CCA for the PIFS time before the backoff counter of the backoff procedure expires. As described in the exemplary embodiment of FIG. 11, when some secondary channels CH3 and CH4 are busy, the terminal performs data transmission by using only the channels CH1 and CH2 of a partial bandwidth, that is, 40 MHz bandwidth, which include the primary channel CH1. However, when the channels CH3 and CH4 which have been impossible to use at a wideband access time become idle and thereby usable while transmitting the data, the terminal may perform additional channel access to the corresponding channels.

According to the exemplary embodiment of the present invention, the terminal may set at least one channel among the secondary channels which are usable (i.e., idle) as an alternative primary channel (APCH). Furthermore, the terminal may perform an additional channel access by using the set alternative primary channel. In the exemplary embodiment of the present invention, the alternative primary channel (APCH) is a primary channel set in addition to the basic primary channel (i.e., primary 20 MHz channel) of the corresponding BSS. The alternative primary channel may operate as a primary channel for at least one channel among secondary channels which are not aggregated with the basic primary channel. That is, in the aforementioned exemplary embodiment, separate bandwidth extension may be performed based on the alternative primary channel similarly to the case where the bandwidth extension for wideband data transmission is performed based on the basic primary channel. The alternative primary channel may be used for the association between the non-AP STA and the AP similarly to the basic primary channel and the backoff procedure, the enhanced distributed coordination access (EDCA), and the like may be performed. In the same BSS, the basic primary channel is set identically for each terminal, but the alternative primary channel may be set independently for each terminal. Accordingly, an alternative primary channel set in some terminals may be different from an alternative primary channel set in other terminals in the same BSS. The non-AP STA may set a new link with the AP by using the alternative primary channel and transmit data through the set link. Meanwhile, in the exemplary embodiment of the present invention, it is described that the basic primary channel is an original primary channel set in the corresponding BSS and has a bandwidth of 20 MHz, but the present invention is not limited thereto and the basic primary channel may be set with another bandwidth in some exemplary embodiments.

FIG. 11 illustrates an exemplary embodiment in which CH3 between the usable secondary channels CH3 and CH4 is set as the alternative primary channel. When the alternative primary channel CH3 becomes idle, the terminal performs a backoff procedure for CH3 after an xIFS time. The xIFS in which the terminal waits before the backoff procedure of the alternative primary channel starts may become the aforementioned AIFS or PIFS and the present invention is not limited thereto. Meanwhile, for the PIFS time before the backoff counter for the alternative primary channel CH3 expires, the terminal performs CCA for another secondary channel CH4 which can be aggregated with the alternative primary channel CH3 to verify whether the corresponding channel is usable. When the alternative primary channel CH3 is maintained to be idle and the backoff counter for the corresponding channel thus expires, the terminal transmits data by using the alternative primary channel CH3. In this case, when the secondary channel CH4 which can be aggregated with the alternative primary channel CH3 is present by maintaining the idle state for the PIFS time before the backoff counter expires, the terminal transmits data by using a wideband channel in which the alternative primary channel CH3 and the corresponding secondary channel CH4 are aggregated with each other.

FIGS. 12 to 19 illustrate various methods for operating an alternative primary channel according to an exemplary embodiment of the present invention. In the respective exemplary embodiments of FIGS. 12 to 19, the same or corresponding parts as those of the exemplary embodiments of the previous drawings will be omitted.

In the exemplary embodiment of FIGS. 12 to 19, it is assumed that CH1 is set as the basic primary channel (i.e., primary 20 MHz channel) and CH8 is set as the alternative primary channel. Each terminal in the BSS obtains basic primary channel information and the alternative primary channel information and attempts bandwidth extension to secondary channels adjacent to the basic primary channel and the alternative primary channel, respectively. The terminal may transmit data through the channels of the secured bandwidth. In the exemplary embodiment of the present invention, 'data' is used as a term including concepts of a data frame, a PLCP protocol data unit (PPDU), a MAC protocol data unit (MPDU), an aggregate MPDU (A-MPDU), and the like according to the implementation. Further, in the exemplary embodiment of the present invention, a 'basic channel group' indicates the basic primary channel itself or a channel having an extended bandwidth, which includes the basic primary channel. In addition, an 'alternative channel group' is used as a term that indicates the alternative primary channel itself or a channel having an extended bandwidth, which includes the alternative primary channel.

Figure 12:
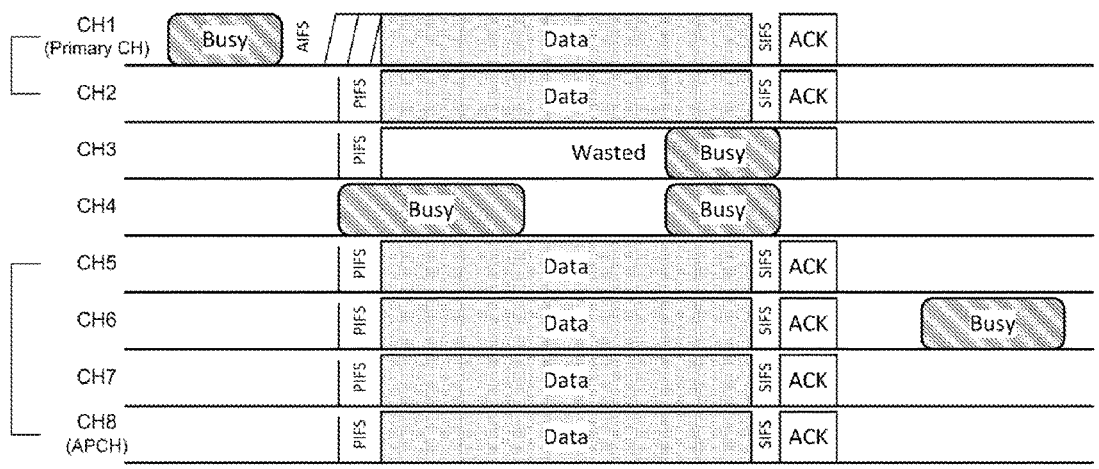
FIGS. 12 to 19 are diagrams illustrating various operation methods of alternative primary channel according to the embodiment of the present invention.

FIG. 12 illustrates an exemplary embodiment of a PIFS sensing based alternative primary channel operation method. According to the exemplary embodiment of FIG. 12, the terminal performs a backoff procedure for the basic primary channel CH1 in order to transmit data and performs CCA for the alternative primary channel CH8 for a PIFS time before the backoff counter of the backoff procedure expires to verify whether the corresponding channel is usable. In this case, for the PIFS time before the backoff counter expires, the terminal may perform CCA even with respect to other secondary channels CH2 to CH7 in addition to the alternative primary channel CH8.

When the basic primary channel CH1 is maintained to be idle and the backoff counter for the corresponding channel thus expires, the terminal transmits data through the basic channel group including the basic primary channel CH1. In order to set the basic channel group, the terminal performs the bandwidth extension based on the CCA result of each secondary channel performed for the PIFS time before the backoff counter for the basic primary channel expires. Referring to FIG. 12, the secondary 20 MHz channel CH2 of the basic primary channel CH1 is idle for the PIFS time before the backoff counter for the basic primary channel CH1 expires, but CH4 among secondary 40 MHz channels is busy. Therefore, the terminal sets CH1 and CH2 as the basic channel group and transmits data through the channel having the 40 MHz bandwidth.

According to the exemplary embodiment of the present invention, when the alternative primary channel CH8 is idle for the PIFS time, the terminal transmits the data even through the alternative channel group including the alternative primary channel CH8. In order to set the alternative channel group, the terminal performs the bandwidth extension based on the CCA result of each secondary channel performed for the PIFS time before the backoff counter for the basic primary channel expires. That is, when secondary channel(s) which can be aggregated with the alternative primary channel CH8 is present by maintaining the idle state for the PIFS time before the backoff counter expires, the terminal transmits data by using the wideband channel in which the alternative primary channel CH8 and the corresponding secondary channel(s) are aggregated with each other. Referring to FIG. 12, the secondary 20 MHz channel CH7 of the alternative primary channel CH8 and the secondary 40 MHz channels CH5 and CH6 are all idle for the PIFS time. Therefore, the terminal sets CH5 to CH8 as the alternative channel group to transmit the data through the channel having the 80 MHz bandwidth.

Meanwhile, according to another exemplary embodiment of the present invention, the terminal may perform a separate backoff procedure for the alternative primary channel to determine whether the corresponding channel is usable. In the exemplary embodiments given below, the backoff procedure for the alternative primary channel is performed to maintain fairness of channel use, while it is determined whether the alternative primary channel is usable only by the CCA for the PIFS time in the exemplary embodiment of FIG. 12.

Figure 13:
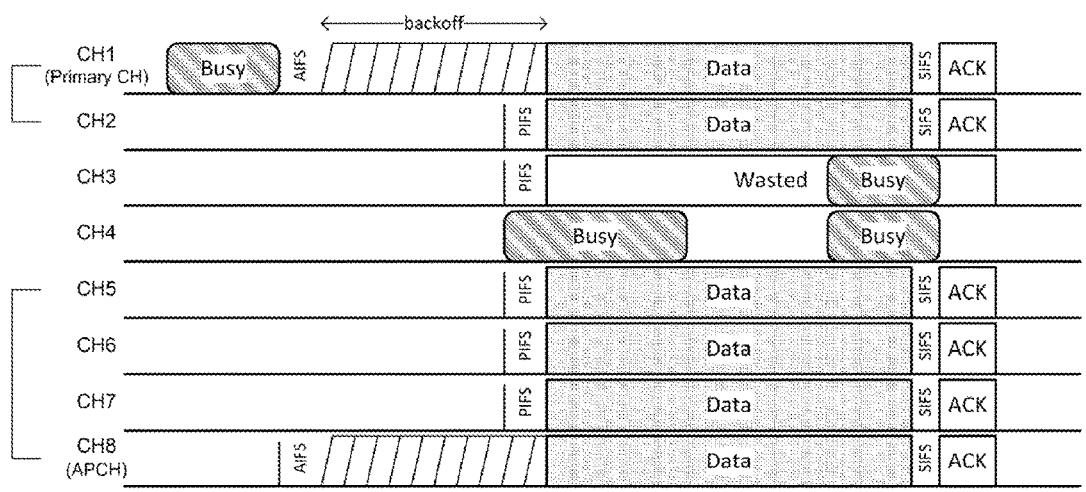
Figure 14:
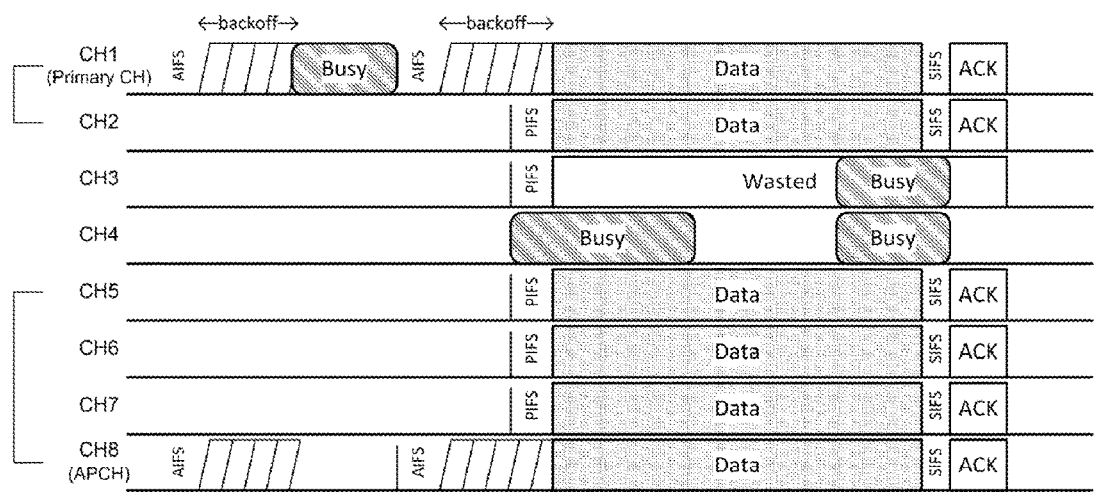
Figure 15:
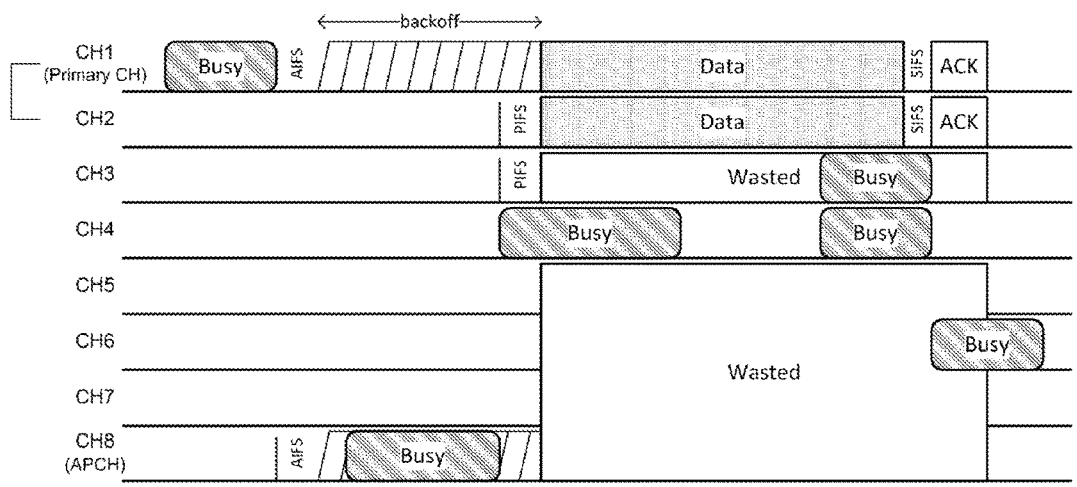

FIGS. 13 to 15 illustrate an exemplary embodiment of a common backoff based alternative primary channel operation method. That is, according to the exemplary embodiment of FIGS. 13 to 15, the backoff counter set in the basic primary channel CH1 is shared as the backoff counter for the alternative primary channel CH8. When the alternative primary channel CH8 is idle until the common backoff counter expires, the terminal may transmit data through the alternative channel group including the alternative primary channel CH8.

FIG. 13 illustrates an exemplary embodiment in which while the backoff procedure for each of the basic primary channel CH1 and the alternative primary channel CH8 is performed, both channels are idle. When the basic primary channel CH1 and the alternative primary channel CH8 are all maintained to be idle and the backoff counter thus expires, the terminal transmits data by using both the basic channel group and the alternative channel group. In this case, based on the CCA result for each of the secondary channels for the PIFS time before the backoff counter expires, the terminal performs the bandwidth extension based on the basic primary channel CH1 and the bandwidth extension based on the alternative primary channel CH8. Accordingly, in the exemplary embodiment of FIG. 13, the terminal transmits the data by using the basic channel group having the 40 MHz bandwidth and the alternative channel group having the 80 MHz bandwidth.

FIG. 14 illustrates an exemplary embodiment in which while the backoff procedure for each of the basic primary channel CH1 and the alternative primary channel CH8 is performed, the basic primary channel CH1 is busy. According to the exemplary embodiment of FIG. 14, when the basic primary channel CH1 is busy, the terminal suspends the backoff procedures for the basic primary channel CH1 and the alternative primary channel CH8. When the busy state of the basic primary channel CH1 ends, the terminal resumes the backoff procedures for the basic primary channel CH1 and the alternative primary channel CH8 after an AIFS time. That is, in the exemplary embodiment of FIG. 14, the backoff procedure of the alternative primary channel CH8 is performed dependently to the backoff procedure of the basic primary channel CH1. Therefore, when the backoff procedure of the basic primary channel CH1 is suspended, the terminal also suspends the backoff procedure of the alternative primary channel CH8. In addition, when the backoff procedure of the basic primary channel CH1 is resumed, the terminal also resumes the backoff procedure of the alternative primary channel CH8. When the alternative primary channel CH8 is maintained to be idle while the backoff procedure is performed, the terminal transmits data by using both the basic channel group and the alternative channel group after the backoff counter expires. Accordingly, in the exemplary embodiment of FIG. 14, the terminal transmits the data by using the basic channel group having the 40 MHz bandwidth and the alternative channel group having the 80 MHz bandwidth.

FIG. 15 illustrates an exemplary embodiment in which while the backoff procedure for each of the basic primary channel CH1 and the alternative primary channel CH8 is performed, the alternative primary channel CH8 is busy. Referring to FIG. 15, the backoff procedure of the alternative primary channel CH8 is performed dependently to the backoff procedure of the basic primary channel CH1, but the backoff procedure of the basic primary channel CH1 may be performed independently from the backoff procedure of the alternative primary channel CH8. That is, when the alternative primary channel CH8 is busy, the backoff procedure of the alternative primary channel CH8 is suspended, but the backoff procedure of the basic primary channel CH1 is continuously performed without suspension. As described above, when the backoff procedure of the basic primary channel CH1 expires, the terminal may transmit the data through the basic channel group including the basic primary channel CH1. However, the data is not transmitted through the alternative primary channel CH8 in which the interference occurs during the backoff procedure. Accordingly, in the exemplary embodiment of FIG. 15, the terminal transmits the data by using the basic channel group having the 40 MHz bandwidth.

Figure 16:
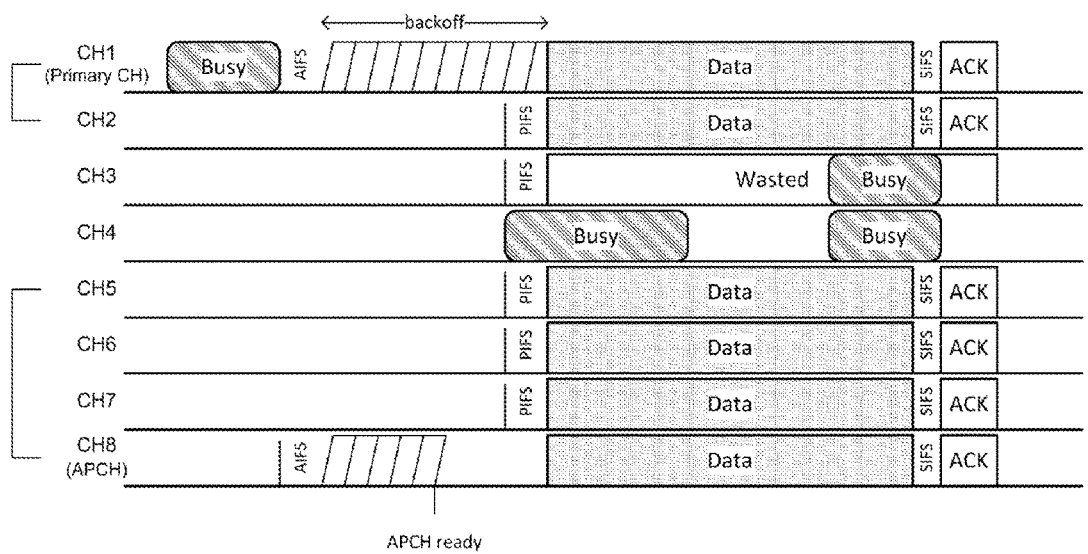
Figure 17:
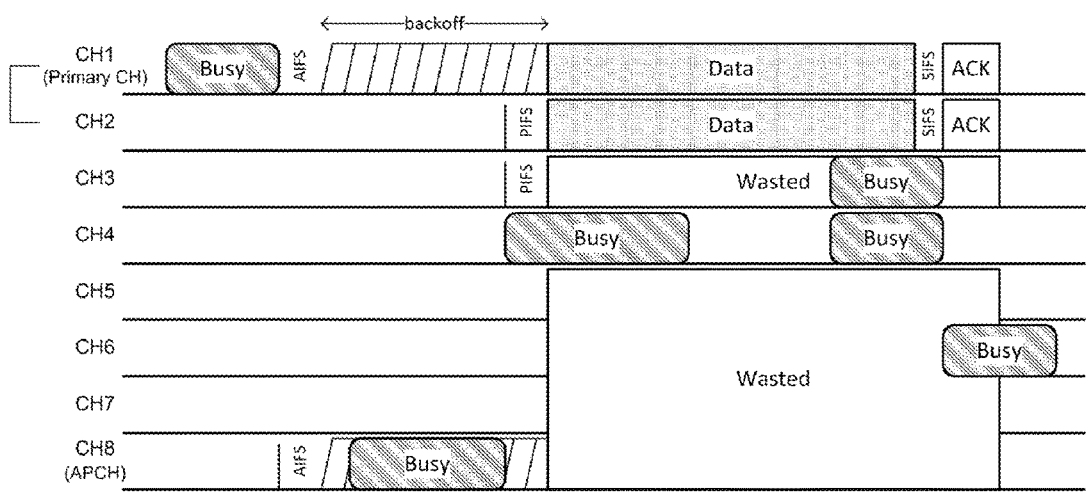

FIGS. 16 and 17 illustrate an exemplary embodiment of an independent backoff based alternative primary channel operation method. That is, according to the exemplary embodiment of FIGS. 16 and 17, the backoff counter for the basic primary channel CH1 and the backoff counter for the alternative primary channel CH8 are set independently from each other. Therefore, a backoff counter value allocated to the alternative primary channel CH8 may be larger or smaller than a backoff counter value allocated to the basic primary channel CH1.

FIG. 16 illustrates an exemplary embodiment in which the backoff counter for the alternative primary channel CH8 expires earlier than the backoff counter for the basic primary channel CH1. When the backoff counter for the alternative primary channel CH8 expires earlier, the terminal switches the alternative primary channel CH8 to an APCH ready state. In the APCH ready state, the terminal defers the data transmission using the alternative primary channel CH8 until the backoff counter for the basic primary channel CH 1 expires. When the backoff counter for the basic primary channel CH1 expires in the APCH ready state and the alternative primary channel CH8 is maintained to be idle until the corresponding time, the terminal transmits the data by using both the basic channel group and the alternative channel group. In this case, based on the CCA result for each of the secondary channels for the PIFS time before the backoff counter for the basic primary channel CH1 expires, the terminal performs the bandwidth extension based on the basic primary channel CH1 and the bandwidth extension based on the alternative primary channel CH8. Accordingly, in the exemplary embodiment of FIG. 16, the terminal transmits the data by using the basic channel group having the 40 MHz bandwidth and the alternative channel group having the 80 MHz bandwidth.

Meanwhile, when the interference occurs in the alternative primary channel CH8 in the APCH ready state and thus the corresponding channel becomes busy, the terminal cancels the APCH ready state. In this case, the terminal is allocated with a new backoff counter for the alternative primary channel CH8 and performs a backoff procedure for the alternative primary channel CH8 by using the new backoff counter when the busy state of the alternative primary channel CH8 ends.

FIG. 17 illustrates an exemplary embodiment in which the backoff counter for the basic primary channel CH1 expires earlier than the backoff counter for the alternative primary channel CH8. When the backoff counter for the basic primary channel CH1 expires earlier, the terminal transmits the data by using only the basic channel group. However, the data is not transmitted through the alternative primary channel CH8 in which the backoff counter has not expired. Accordingly, in the exemplary embodiment of FIG. 17, the terminal transmits the data by using the basic channel group having the 40 MHz bandwidth. According to an exemplary embodiment of the present invention, when the backoff counter for the basic primary channel CH1 expires, the backoff counter for the alternative primary channel CH8 may be suspended while the data is transmitted through the basic primary channel CH1.

Meanwhile, according to yet another exemplary embodiment of the present invention, the terminal may transmit the data through the alternative primary channel independently regardless of whether the data is transmitted through the basic primary channel. That is, even when the basic primary channel is busy and the terminal may not thus use the basic primary channel, the terminal may transmit the data by using the alternative primary channel.

Figure 18:
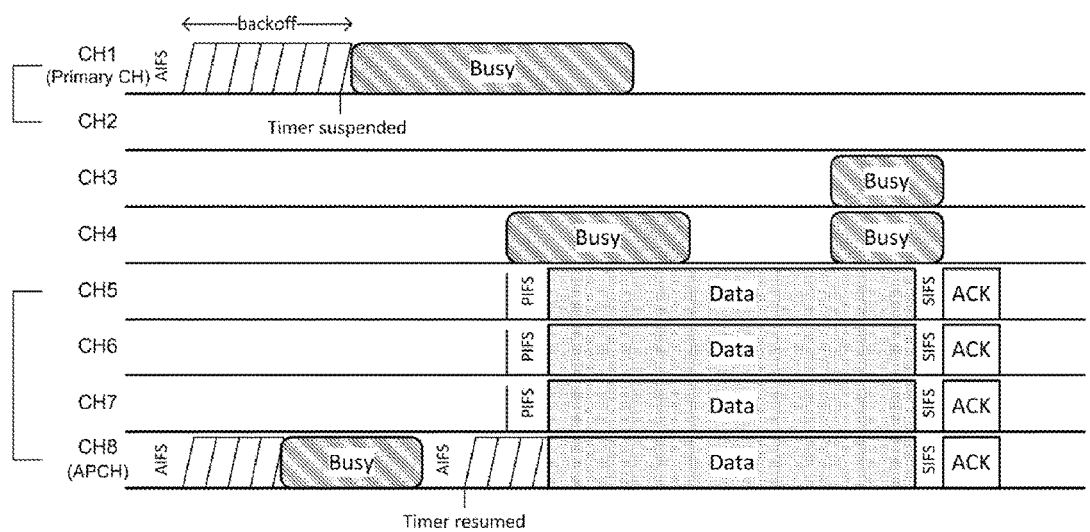

FIG. 18 illustrates an exemplary embodiment of independently using the alternative primary channel. According to the exemplary embodiment of FIG. 18, the backoff procedures are performed for the basic primary channel CH1 and the alternative primary channel CH8 by using the common backoff counter and in the backoff procedures of each channel, the common backoff counter is suspended only when both the basic primary channel CH1 and the alternative primary channel CH8 are busy. However, when at least one of the basic primary channel CH1 and the alternative primary channel CH8 is idle, the common backoff counter is resumed. The terminal may transmit the data by using the primary channel(s) which is idle when the common backoff counter expires. That is, when both the basic primary channel CH1 and the alternative primary channel CH8 are idle, the terminal transmits the data by using both the basic channel group and the alternative channel group. In addition, when only any one of both channels is idle, the terminal transmits the data only through the channel group including the idle primary channel.

Referring to FIG. 18, the alternative primary channel CH8 becomes busy earlier while the backoff procedures for the basic primary channel CH1 and the alternative primary channel CH8 are performed, but since the basic primary channel CH1 is idle, the common backoff counter is not suspended. However, when the basic primary channel CH1 becomes additionally busy so that both channels CH1 and CH8 become busy, the common backoff counter is suspended. According to the exemplary embodiment of FIG. 18, while the common backoff counter is suspended, the alternative primary channel CH8 returns to be idle again and the common backoff counter is resumed again after an AIFS time. When the common backoff counter expires, the basic primary channel CH1 is busy, while the alternative primary channel CH8 is idle. Therefore, the terminal transmits the data by using the alternative channel group including the idle alternative primary channel CH8.

Figure 19:
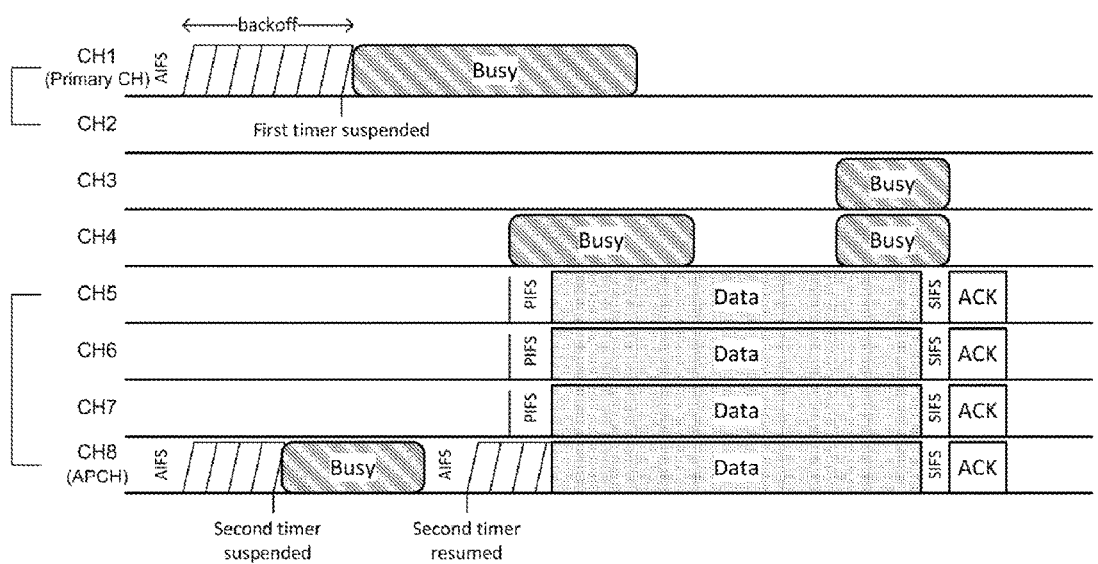

FIG. 19 illustrates another exemplary embodiment of independently using the alternative primary channel. According to the exemplary embodiment of FIG. 19, the backoff procedure of the alternative primary channel CH8 may be performed independently from the backoff procedure of the basic primary channel CH1. In this case, the backoff counter for the alternative primary channel CH8 may be set equal to the backoff counter for the basic primary channel CH1. Alternatively, the backoff counter for the alternative primary channel CH8 may be set as a separate backoff counter.

That is, in the exemplary embodiment of FIG. 19, the terminal is separately allocated with a first backoff counter (i.e. timer) for the basic primary channel CH1 and a second backoff counter (i.e. timer) for the alternative primary channel CH8. In this case, the terminal may perform the backoff procedures for the respective primary channels CH1 and CH8 by using the allocated individual backoff counters. Referring to FIG. 19, the terminal performs the backoff procedure for the basic primary channel CH1 by using the first backoff counter and suspends the first backoff counter when the basic primary channel CH1 is busy. Similarly, the terminal performs the backoff procedure for the alternative primary channel CH8 by using the second backoff counter and suspends the second backoff counter when the alternative primary channel CH8 is busy. As illustrated in FIG. 19, while the second backoff counter is suspended, the alternative primary channel CH8 returns to be idle again and the terminal resumes the second backoff counter after an AIFS time. When the second backoff counter expires, the terminal transmits the data by using the alternative channel group including the alternative primary channel CH8.

The aforementioned exemplary embodiments of the present invention may be used for data transmission of the terminal through combination with Orthogonal Frequency Division Multiple Access (OFDMA). That is, the channels secured by the aforementioned exemplary embodiments may be allocated to one terminal, but alternatively allocated to a plurality of terminals in a wireless LAN system to which the OFDMA is applied.

Figure 20:
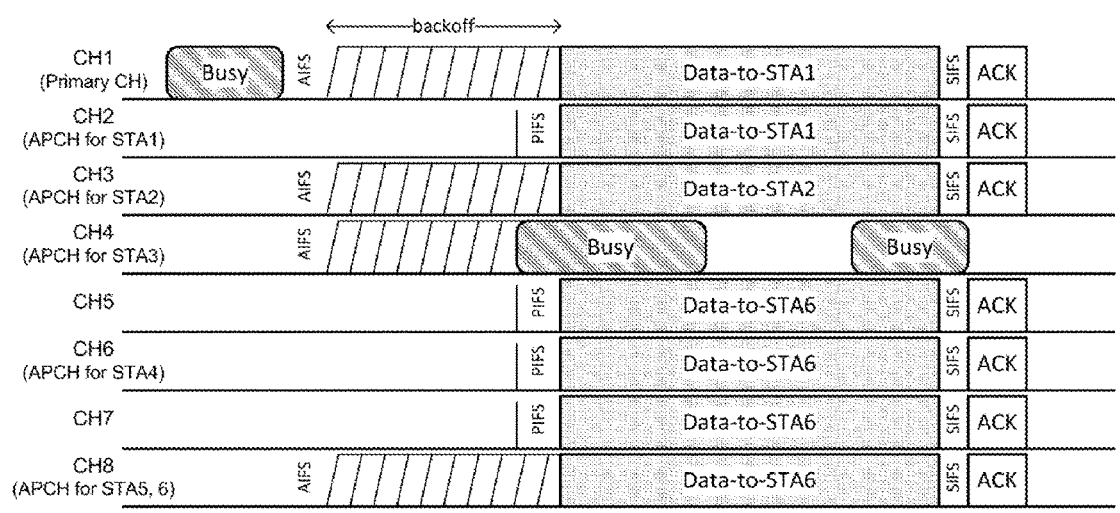
FIGS. 20 to 22 are diagrams illustrating methods for applying an alternative primary channel to multiple users according to the embodiment of the present invention.
Figure 21:
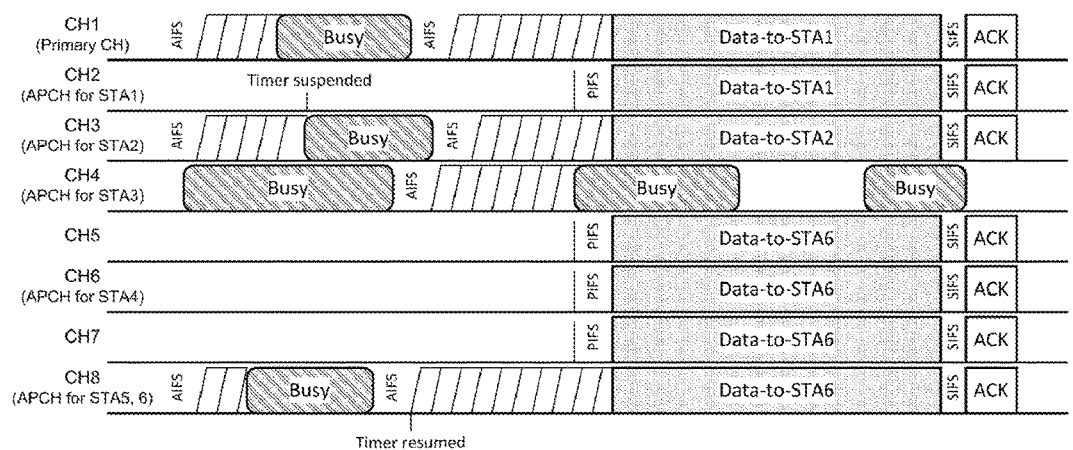
Figure 22:
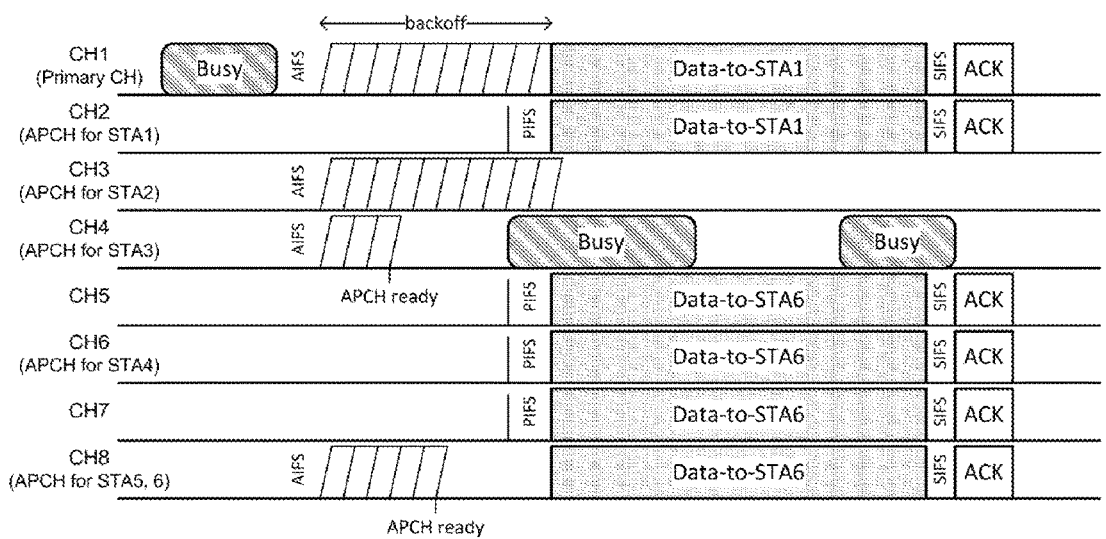

FIGS. 20 to 22 illustrate methods for applying an alternative primary channel to multiple users according to the embodiment of the present invention. According to an embodiment of the present invention, the alternative primary channel may be set independently for each terminal (herein, the terminal may be a non-AP STA) of the multiple users. If the alternative primary channel is set for multiple users, the AP may allocate at least one alternative primary channel for each of at least some terminals in the BSS. The alternative primary channel is allocated to each terminal in a link setting step or a re-association step, and two or more terminals may share a single alternative primary channel.

A terminal that has been allocated an alternative primary channel performs operations, which had been performed based on a basic primary channel, by using both the basic primary channel and the APCH. In other words, the terminal that has been allocated an alternative primary channel senses and decodes the alternative primary channel as like the terminal senses and decodes the basic primary channel. Accordingly, the terminal that has been allocated the alternative primary channel may transmit and receive data through a band (i.e., an alternative channel group) including the alternative primary channel in addition to transmitting and receiving data through a band (i.e., a basic channel group) including the basic primary channel.

In the embodiments of FIGS. 20 to 22, it is assumed that alternative primary channels are allocated to six terminals in the BSS. In addition, it is assumed that CH2 is set as an alternative primary channel of STA1, CH3 is set as an alternative primary channel of STA2, CH4 is set as an alternative primary channel of STA3, CH6 is set as an alternative primary channel of STA4, and CH8 is set as an alternative primary channel of STA5 and STA6, respectively. Furthermore, it is assumed that the AP attempts to transmit downlink data to STA1, STA2, STA3 and STA6 among the terminals. In the exemplary embodiments of FIGS. 20 to 22, the same or corresponding parts as those of the aforementioned exemplary embodiments of the FIGS. 12 to 19 will be omitted.

First, referring to FIG. 20, the AP performs backoff procedures for the basic primary channel and the alternative primary channels of the corresponding terminals to transmit data to each of the terminals STA1, STA2, STA3 and STA6. That is, during the entire duration in which the backoff procedure of the basic primary channel is performed, the AP performs CCA on the alternative primary channels allocated to the STAs which are the targets of the data transmission to determine the channel state. If the alternative primary channel maintains idle state during the backoff procedure, the AP transmits data to the STA through the corresponding alternative primary channel. In this case, the AP may perform the bandwidth extension based on the basic primary channel and the bandwidth extension based on the alternative primary channel based on the CCA results for each of the secondary channels for the PIFS time before the backoff counter expires. However, if the alternative primary channel becomes busy during the backoff procedure, the backoff procedure of the alternative primary channel is suspended and the AP does not transmit data to the STA through the corresponding alternative primary channel.

Accordingly, in the embodiment of FIG. 20, since CH3 maintains idle state during the backoff procedure, the AP transmits data to STA2 through the CH3. However, since CH4 becomes busy during the backoff procedure, the AP does not transmit data to STA3. In case of STA6, since the alternative primary channel CH8 is available and furthermore, the other secondary channels CH5 to CH7 that can be aggregated with the CH8 have maintained idle for PIFS time before the backoff counter expires, the data transmission is performed through an alternative primary channel group of 80 MHz bandwidth in which CH5 to CH8 are aggregated. Meanwhile, in the embodiment of FIG. 20, the backoff procedure for STA1 was performed on the basic primary channel CH1 instead of the alternative primary channel CH2. That is, the AP may perform the backoff procedure and the data transmission through the alternative primary channel allocated to each STA, but the AP may alternatively perform the backoff procedure and the data transmission through the basic primary channel.

Meanwhile, in addition to the embodiment illustrated in FIG. 20, various channel access methods can be performed for multiple users. For example, it is illustrated in FIG. 20 that the CCA for the alternative primary channel is performed during the entire time in which the backoff procedure is performed. However, the availability of the alternative primary channel may be determined by CCA during a PIFS time before the expiration of the backoff as like the existing secondary channels.

FIG. 21 illustrates another embodiment of the present invention, which is a multi-user alternative primary channel operation based on a common backoff. According to an embodiment of FIG. 21, AP performs the backoff procedure using common backoff counter (i.e., common backoff timer) for the basic primary channel and alternative primary channels of STAs which are the targets of the transmission. The AP may control the operation of the common backoff counter by using both the state information of basic primary channel and each of the at least one alternative primary channel. According to the embodiment of FIG. 21, the AP may suspend the backoff procedure using the common backoff counter when both the basic primary channel and the alternative primary channel in which the backoff procedure is performed are busy, and may proceed (or, resume) the backoff procedure when at least one of the channels is idle. However, according to another embodiment, the AP may suspend the backoff procedure using the common backoff counter when at least one of the basic primary channel and the alternative primary channel in which the backoff procedure is performed is busy, and may proceed (or, resume) the backoff procedure when both the channels are idle.

More specifically, referring to FIG. 21, the AP performs the backoff procedure for the basic primary channel CH1 and at least one alternative primary channel CH3, CH4, CH8 to perform the channel access for data transmission multiple users. In the embodiment of FIG. 21, one of the alternative primary channels, that is CH4, becomes busy but the backoff procedure of the AP continues since the basic primary channel and another alternative primary channels are idle. Next, the alternative primary channel CH8 and the basic primary channel CH1 becomes busy in sequence, but the backoff procedure is not suspended since the alternative primary channel CH3 is still idle. However, when the CH3 becomes busy thereby all of the basic primary channel and the alternative primary channels are busy, the AP suspends the backoff procedure. The suspended backoff procedure is resumed as the alternative primary channel CH8 becomes idle again.

When the common backoff counter of the backoff procedure expires, AP transmits data using the idle channels at the expiration of the corresponding counter. In the embodiment of FIG. 21, the AP transmits data to multiple users by using CH1, CH3 and CH8, except CH4 in busy state, as the basic primary channel or alternative primary channels. In this case, the bandwidth extension schemes based on each of the basic primary channel and the alternative primary channel are the same as the aforementioned embodiments. Therefore, the AP transmits data to STA1 through 40 MHz bandwidth in which the basic primary channel CH1 and the secondary channel CH2 are aggregated, and transmits data to STA2 through the alternative primary channel CH3. In addition, the AP transmits data to STA6 through 80 MHz bandwidth in which the alternative primary channel CH8 and the secondary channels CH5 to CH7 are aggregated.

FIG. 21 illustrates yet another embodiment of the present invention, which is a multi-user alternative primary channel operation based on an independent backoff. According to an embodiment of FIG. 22, AP performs the backoff procedure using independent backoff counters for each of the basic primary channel and the alternative primary channels of STAs which are the targets of the transmission. Even when independent backoff counters are used for the basic primary channel and the alternative primary channel, since the data transmission timings for the multiple users should be the same, the AP initiate the data transmission for the multiple users based on a single channel. According to an embodiment of the present invention, the AP may initiate the data transmission for the multiple users based on the backoff procedure of the basic primary channel CH1. In this case, backoff timers of other alternative primary channels are used as a tool for notifying whether each alternative primary channel is ready for the transmission and as a toll for channel contention before the backoff timer of the basic primary channel expires and the data transmission is performed.

In the embodiment of FIG. 22, if the backoff counter for the alternative primary channel expires prior to the backoff counter of the basic primary channel, the AP sets the corresponding alternative primary channel as a ready state (i.e., APCH ready). In the ready state (i.e., APCH ready) of the alternative primary channel, the AP defers data transmission through the alternative primary channel until the backoff counter for the basic primary channel expires. When the backoff counter for the basic primary channel expires, the AP performs the multi-user transmission using the basic primary channel and the alternative primary channel in the ready state (i.e., APCH ready). More specifically, if the backoff counter for the basic primary channel expires in the ready state (i.e., APCH ready) of the alternative primary channel and the alternative primary channel maintains idles until that time, the AP uses the alternative primary channel for the multi-user transmission. In this case, the AP may perform the bandwidth extension based on the basic primary channel and the bandwidth extension based on the alternative primary channel as the aforementioned embodiments.

On the other hand, when interference occurs in the ready state (i.e., APCH ready) of the alternative primary channel thereby the corresponding channel becomes busy, the AP cancels the ready state (i.e., APCH ready) of the alternative primary channel. The AP allocates a new backoff counter for the alternative primary channel and performs a backoff procedure for the alternative primary channel using the new backoff counter when the busy state is terminated. If the backoff counter of the basic primary channel expires prior to the backoff counter of the alternative primary channel, the AP is blocked from the access to the alternative primary channel. Access to the alternative primary channel for which the access is blocked may be performed by the following backoff procedure. In this case, the backoff procedure for the alternative primary channel is performed using the remaining backoff counter in the previous backoff procedure.

More specifically, referring to FIG. 22, the AP performs backoff procedures for the basic primary channel and the alternative primary channels allocated to each terminal to secure data transmission opportunities for STA1, STA2, STA3 and STA6. In the embodiment of FIG. 22, the backoff procedure for STA1 is performed through basic primary channel CH1. In this case, CH4 which is an alternative primary channel of STA3 and CH8 which is an alternative primary channel of STA6 are ready state (i.e., APCH ready) as the backoff counters thereof expire prior to the basic primary channel CH1. However, the backoff counter of CH3, an alternative primary channel of STA2, expires later than the backoff counter of the basic primary channel CH1. When the backoff counter of the basic primary channel CH1 expires, the AP transmits data to the STA1 through a basic channel group including the basic primary channel CH1 and the aggregated channel CH2. However, since the backoff counter for the alternative primary channel CH3 has not expired until the backoff counter for the basic primary channel CH1 has expired, the AP would not be able to acquire opportunities for data transmission to STA2 which uses CH3 as the alternative primary channel. The alternative primary channel CH4 enters the ready state (i.e., APCH ready) but the corresponding channel becomes busy before the backoff counter for the basic primary channel CH1 expires, thereby the AP loses the opportunity for data transmission to STA3 which uses CH4 as the alternative primary channel. Meanwhile, the alternative primary channel CH6 enters the ready state (i.e., APCH ready) and maintains the idle state until backoff counter for the basic primary channel CH1 expires, so that the AP acquires an opportunity for data transmission to STA6 which uses CH6 as the alternative primary channel. In this case, the AP performs the bandwidth extension based on the alternative primary channel CH6 and transmits data to the STA6 through a bandwidth of 80 MHz including CH5 to CH8.

Figure 23:
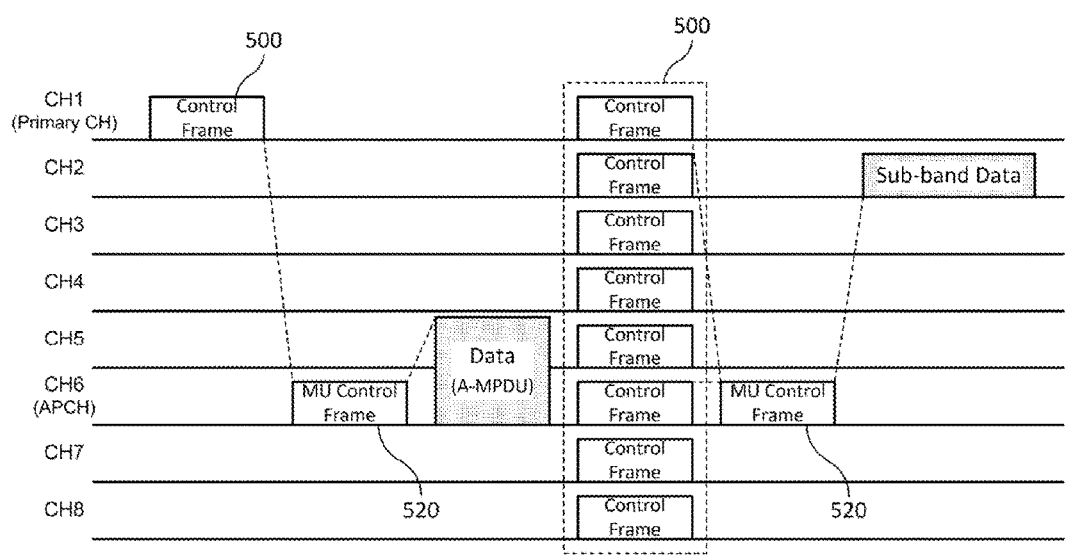
FIG. 23 is a diagram illustrating a method of operating an alternative primary channel for multi-user control.

FIG. 23 illustrates a method of operating an alternative primary channel for multi-user control. According to the embodiment of the present invention, a control signal for the multi-user transmission using multi-user MIMO (MU-MIMO) or orthogonal frequency division multiple access (OFDMA) may be transmitted though the alternative primary channel.

When performing multi-user transmission using OFDMA or the like, data is transmitted to a plurality of user terminals on a channel (or sub-channel) basis. In this case, guarantee of transmission opportunity using RTS/CTS for each user and transmission of a multi-user control frame are necessary. Herein, the multi-user control frame includes a frame for resource allocation of multiple users, a frame for controlling data transmission/reception operations of multiple users, and the like. If the multi-user control frames are transmitted only through the basic primary channel, the overhead in the basic primary channel increases and the performance degradation is likely to occur. In particular, as the number of target users increases, the size of the multi-user control frame may increase in proportion thereto. Therefore, it is important to reduce overhead in a specific channel by distributing transmission channels of the control frame in the multi-user environment.

Referring to FIG. 23, a terminal having an alternative primary channel may perform transmission and reception of a control frame 520 though the alternative primary channel, as well as transmission and reception of a control frame 500 through the basic primary channel. In this case, the terminal can receive the control frame 520 transmitted through the alternative primary channel without a separate resource allocation frame. FIG. 23 shows a situation in which CH6 is allocated as an alternative primary channel of the terminal among the secondary channels. The AP may transmit the control frame 500 through the basic primary channel CH1 or all of the channels CH1 to CH8. In addition, the AP may transmit the control frame 520 through the alternative primary channel CH6, and the transmitted control frame 520 includes a multi-user control frame. According to an embodiment of the present invention, the multi-user control frame may include indicator information for a specific channel on which data transmission is to be performed.

In general, the terminal transmits and receives data frames through a basic channel group or an alternative channel group. However, according to another embodiment of the present invention, the terminal may transmit and receive data frames through a specific channel indicated by the control frame 520 received through the alternative primary channel. In this case, the transmitted and received data frames include subband data of less than 20 MHz as well as wideband data of 40 MHz or more. FIG. 23 shows a situation in which a subband data frame is transmitted through the CH2 indicated by the control frame 520.

Figure 24:
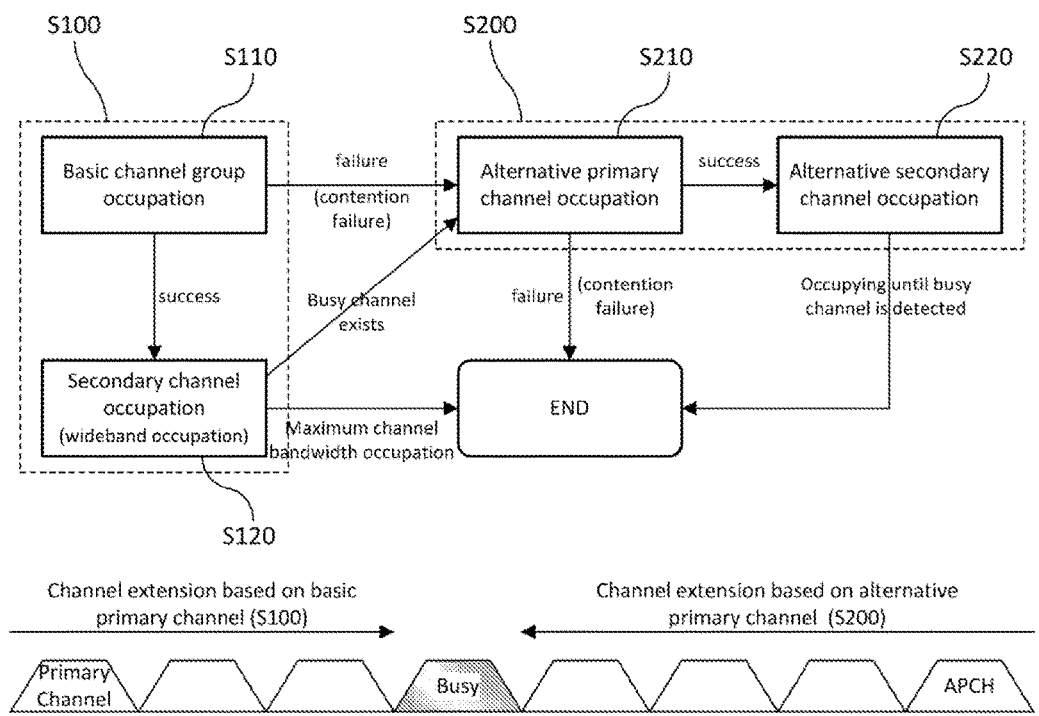
FIG. 24 is a flowchart illustrating a channel access method of a terminal according to the embodiment of the present invention.

FIG. 24 is a flowchart illustrating a channel access method of a terminal according to the embodiment of the present invention. Each step of FIG. 24 is performed by the terminal of the present invention, that is, the AP and the non-AP STA. According to the embodiment of the present invention, the terminal performs channel extension through a basic channel group occupation step S100 and an alternative channel group occupation step S200. As described above, the basic channel group refers to a basic primary channel itself or a channel of an extended bandwidth including the basic primary channel, and the alternative channel group refers to an alternative primary channel itself or a channel of an extended bandwidth including the alternative primary channel.

First, the basic channel group occupation step S100 includes a basic primary channel occupation step S110 and a secondary channel occupation step S120. The terminal performs the basic primary channel occupation step S110 through a backoff procedure for the basic primary channel. If the terminal succeeds in occupying the basic primary channel (i.e., succeeds in channel contention), the terminal performs the secondary channel occupation step S120. In the secondary channel occupation step S120, the terminal performs CCA for the secondary channels for the PIFS time before the backoff counter of the backoff procedure for the basic primary channel expires, and occupies adjacent secondary channels determined to be idle. If the terminal occupies the maximum channel bandwidth in step S120, the terminal terminates the channel extension procedure.

If the terminal fails to occupy the basic primary channel (i.e., fails in channel contention) in step S110 or fails to occupy the maximum channel bandwidth due to the detection of a secondary channel determined to be busy in step S120, the terminal performs the alternative channel group occupation step S200. The alternative channel occupation step S200 includes an alternative primary channel occupation step S210 and an alternative secondary channel occupation step S220. In the alternative primary channel occupation step S210, the terminal attempts to occupy the alternative primary channel according to the various embodiments of FIGS. 12 to 22 described above. Meanwhile, it is shown that the alternative primary channel occupation step S210 is performed only when the terminal fails to occupy the basic primary channel in FIG. 24, but according to another embodiment of the present invention, the terminal may independently perform the alternative primary channel occupation step S210 regardless of whether the occupation of the basic primary channel is failed.

If the terminal succeeds in occupying the alternative primary channel (i.e., succeeds in channel contention), the alternative secondary channel occupation step S220 is performed. In an embodiment of the present invention, the alternative secondary channel refers to a channel, among secondary channels, which is aggregated with the alternative primary channel. In the alternative secondary channel occupation step S220, the terminal performs CCA for the secondary channels for the PIFS time before the backoff counter of the backoff procedure for the alternative primary channel expires, and occupies adjacent secondary channels determined to be idle.

If the terminal fails to occupy the alternative primary channel in step S210 or no further channel extension is possible due to the detection of a secondary channel determined to be busy in step S220, the terminal terminates the channel extension procedure.

Figure 25:
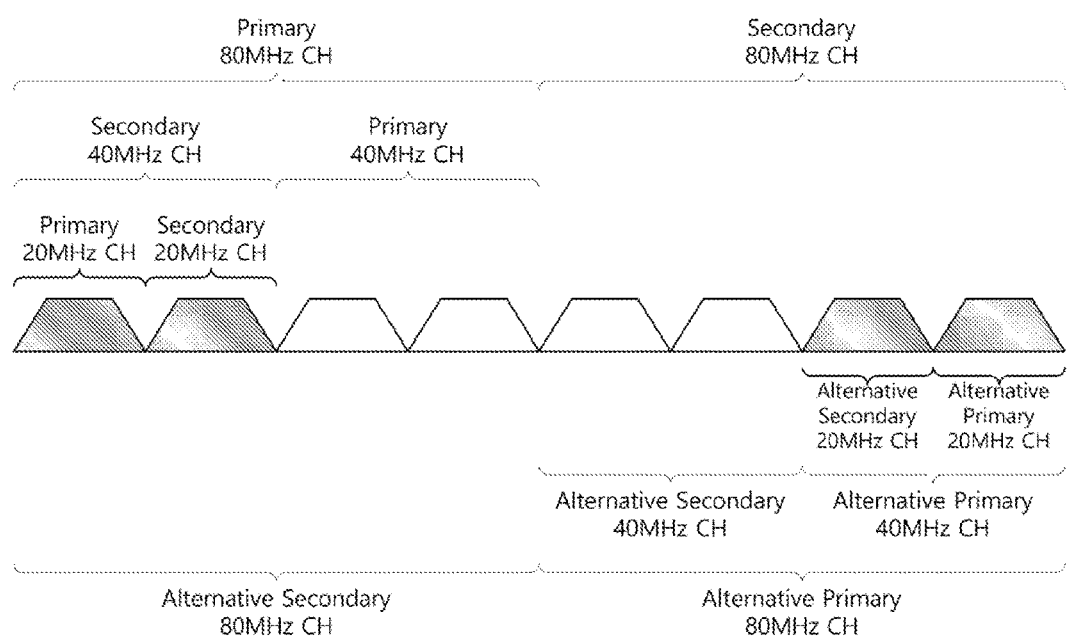
FIGS. 25 to 27 are diagrams illustrating a channel extension method of a terminal according to the first embodiment of the present invention.
Figure 26:
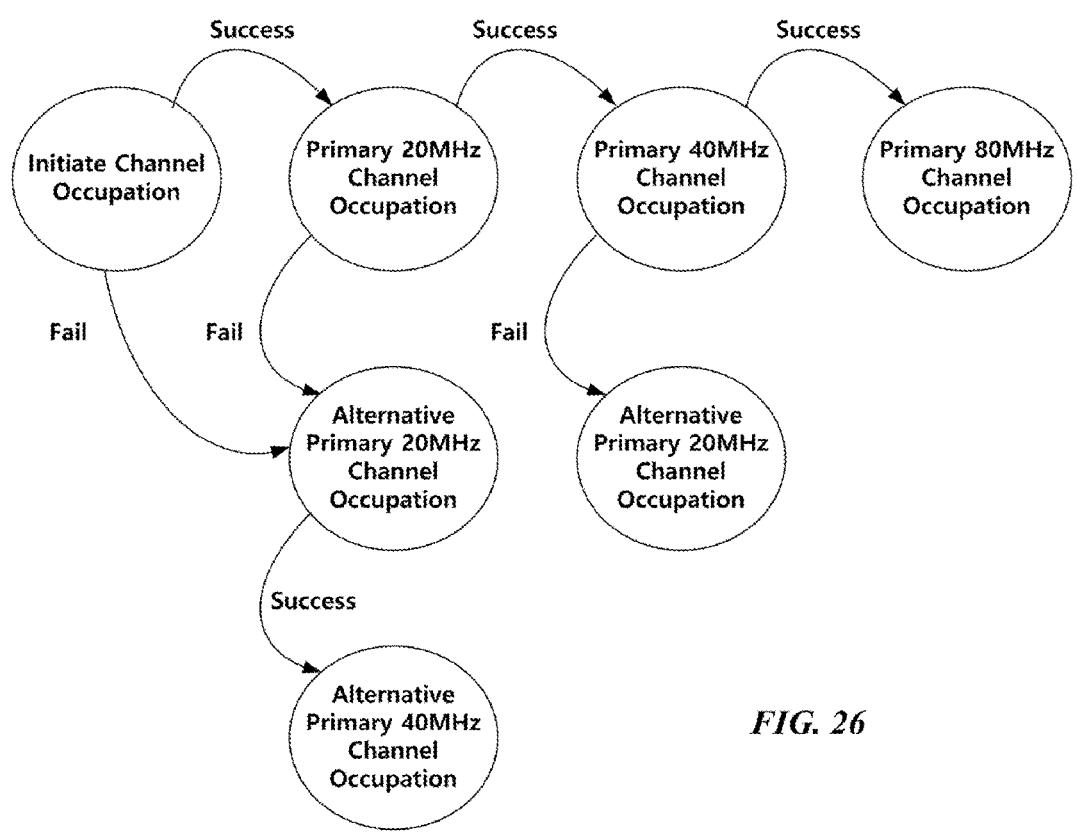
Figure 27:
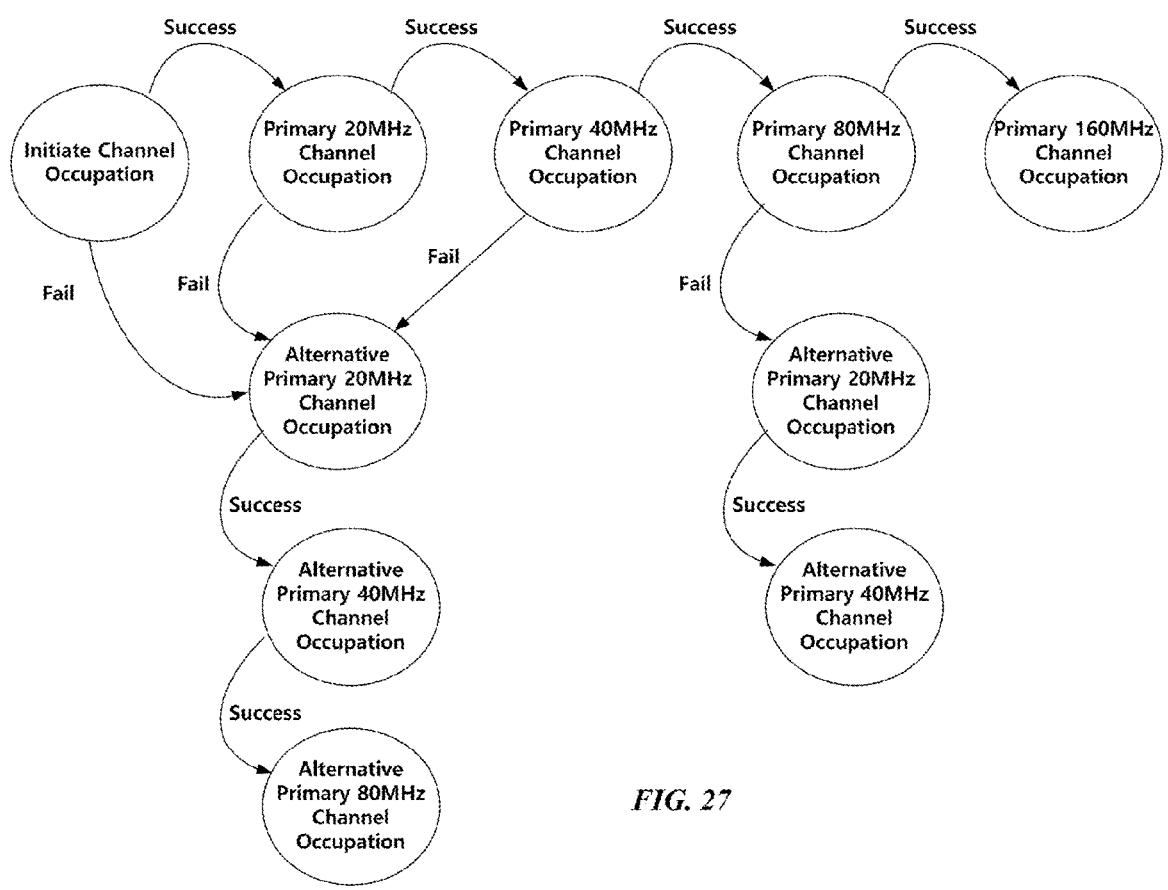

FIGS. 25 to 27 illustrate a channel extension method of a terminal according to the first embodiment of the present invention. According to the first embodiment of the present invention, the terminal can perform the channel extension in units of twice the bandwidth, with the basic primary channel or the alternative primary channel of 20 MHz as a basic bandwidth.

In more detail, referring to FIG. 25, the terminal may perform the extension of the basic channel group and the alternative channel group to 40 MHz, 80 MHz, and 160 MHz by using 20 MHz as a basic bandwidth, in the same manner as the extension rule of the basic primary channel described above in the embodiment of FIG. 8. In case of the bandwidth extension of the basic channel group, 20 MHz band is used when the terminal occupies only the basic primary channel, and total 40 MHz band is used when the terminal occupies primary 20 MHz channel and secondary 20 MHz channel. In addition, total 80 MHz band is used when the terminal occupies primary 40 MHz channel and secondary 40 MHz channel, and total 160 MHz band is used when the terminal occupies primary 80 MHz channel and secondary 80 MHz channel.

Likewise, in case of the bandwidth extension of alternative channel group, 20 MHz band is used when the terminal occupies only the alternative primary channel, and total 40 MHz band is used when the terminal occupies alternative primary 20 MHz channel and alternative secondary 20 MHz channel. In addition, total 80 MHz band is used when the terminal occupies alternative primary 40 MHz channel and alternative secondary 40 MHz channel, and total 160 MHz band is used when the terminal occupies alternative primary 80 MHz channel and alternative secondary 80 MHz channel. However, as in the aforementioned embodiment, when the alternative channel group occupation step is performed dependent on the basic channel group occupation step, that is, when the alternative channel group occupation step is performed in a state where the maximum channel bandwidth is not secured in the basic channel group occupation step, the alternative channel group of 160 MHz band cannot exist.

FIG. 26 illustrates a process of occupying the basic channel group and the alternative channel group according to the first embodiment of the present invention when the terminal supports a maximum 80 MHz band (that is, when the maximum channel bandwidth is 80 MHz). First, when the channel occupation process is initiated, the terminal performs the basic channel group occupation step and attempts to occupy a basic primary 20 MHz channel. If the terminal succeeds in occupying the basic primary 20 MHz channel, the terminal attempts to occupy a basic 40 MHz channel group. If the terminal succeeds in occupying the basic primary 40 MHz channel, the terminal attempts to occupy a basic 80 MHz channel group.

However, if the terminal fails to occupy the maximum channel bandwidth (i.e., 80 MHz) in the basic channel group occupation step, the terminal performs the alternative channel group occupation step. First, if the terminal fails to occupy the basic primary 20 MHz channel, the terminal attempts to occupy the alternative primary 20 MHz channel and adjacent channels. Even if the terminal occupies the basic primary 20 MHz channel and fails to occupy additional channel due to busy state of an adjacent channel, the terminal attempts to occupy the alternative primary 20 MHz channel and adjacent channels. In this case, the terminal may additionally occupy the alternative channel group of 20 MHz or 40 MHz depending on whether the alternative primary 20 MHz channel and its adjacent channels are available. On the other hand, if the terminal occupies the basic 40 MHz channel group and fails to occupy additional channel due to busy state of an adjacent channel, the terminal attempts to occupy the alternative primary 20 MHz channel. In addition, if the terminal succeeds in occupying the basic primary 80 MHz group, the terminal does not perform the alternative channel group occupation step since all the available channels are occupied.

FIG. 27 illustrates a process of occupying the basic channel group and the alternative channel group according to the first embodiment of the present invention when the terminal supports a maximum 160 MHz band (that is, when the maximum channel bandwidth is 160 MHz). First, when the channel occupation process is initiated, the terminal performs the basic channel group occupation step and attempts to occupy a basic primary 20 MHz channel. If the terminal succeeds in occupying the basic primary 20 MHz channel, the terminal attempts to occupy a basic 40 MHz channel group. If the terminal succeeds in occupying the basic primary 40 MHz channel, the terminal attempts to occupy a basic 80 MHz channel group. If the terminal also succeeds in occupying the basic primary 80 MHz channel, the terminal attempts to occupy a basic 160 MHz channel group.

However, if the terminal fails to occupy the maximum channel bandwidth (i.e., 160 MHz) in the basic channel group occupation step, the terminal performs the alternative channel group occupation step. First, if the terminal fails to occupy the basic primary 20 MHz channel, the terminal attempts to occupy the alternative primary 20 MHz channel and adjacent channels. Even if the terminal occupies the basic primary 20 MHz channel and fails to occupy additional channel due to busy state of an adjacent channel, or even if the terminal occupies the basic 40 MHz channel group and fails to occupy additional channel due to busy state of an adjacent channel, the terminal attempts to occupy the alternative primary 20 MHz channel and adjacent channels. In this case, the terminal may additionally occupy the alternative channel group of 20 MHz, 40 MHz or 80 MHz depending on whether the alternative primary 20 MHz channel and its adjacent channels are available. On the other hand, if the terminal occupies the basic 80 MHz channel group and fails to occupy additional channel due to busy state of an adjacent channel, the terminal may additionally occupy the alternative channel group of 20 MHz or 40 MHz depending on whether the alternative primary 20 MHz channel and its adjacent channels are available. In addition, if the terminal succeeds in occupying the basic primary 160 MHz group, the terminal does not perform the alternative channel group occupation step since all the available channels are occupied.

Figure 28:
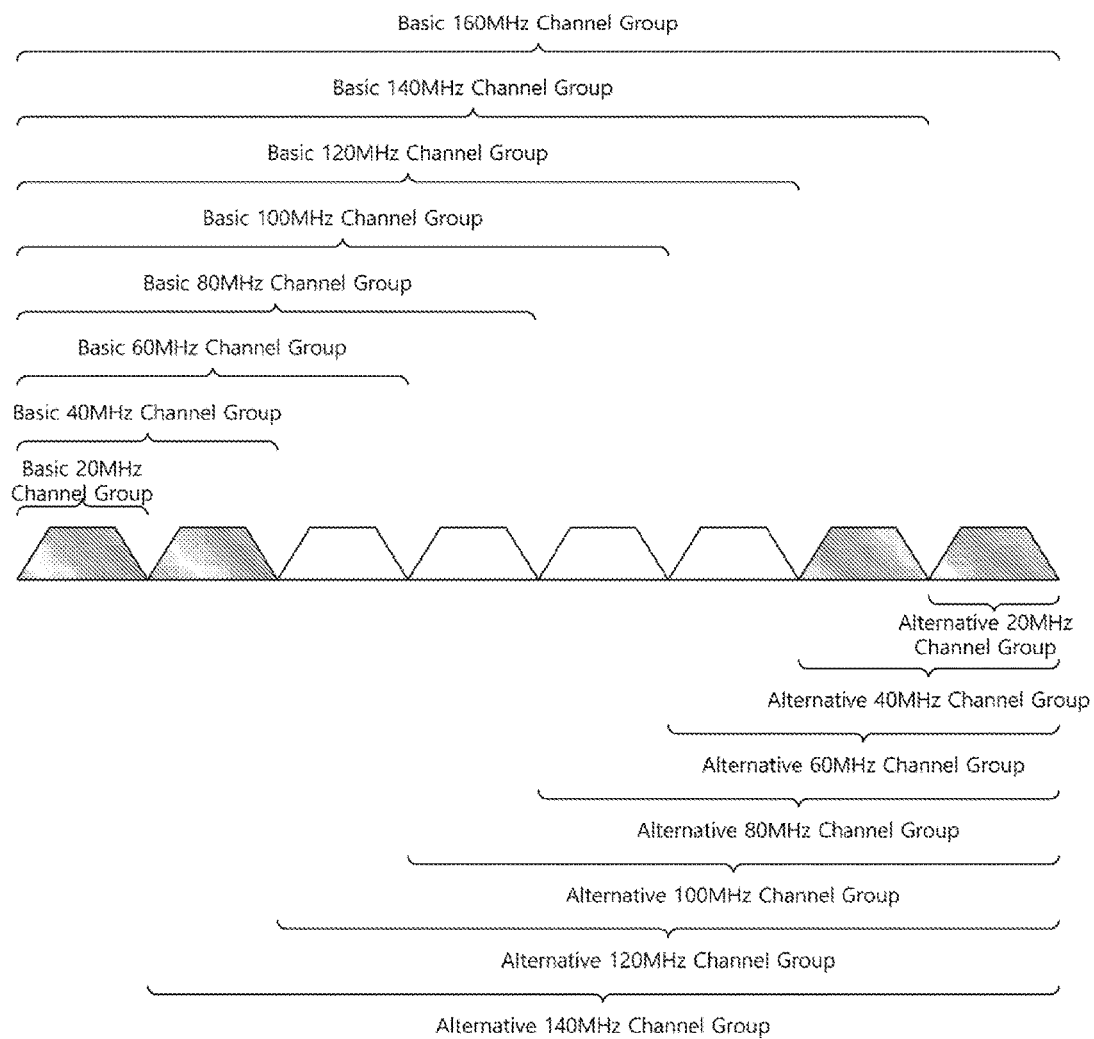
FIGS. 28 to 30 are diagrams illustrating a channel extension method of a terminal according to the second embodiment of the present invention.
Figure 29:
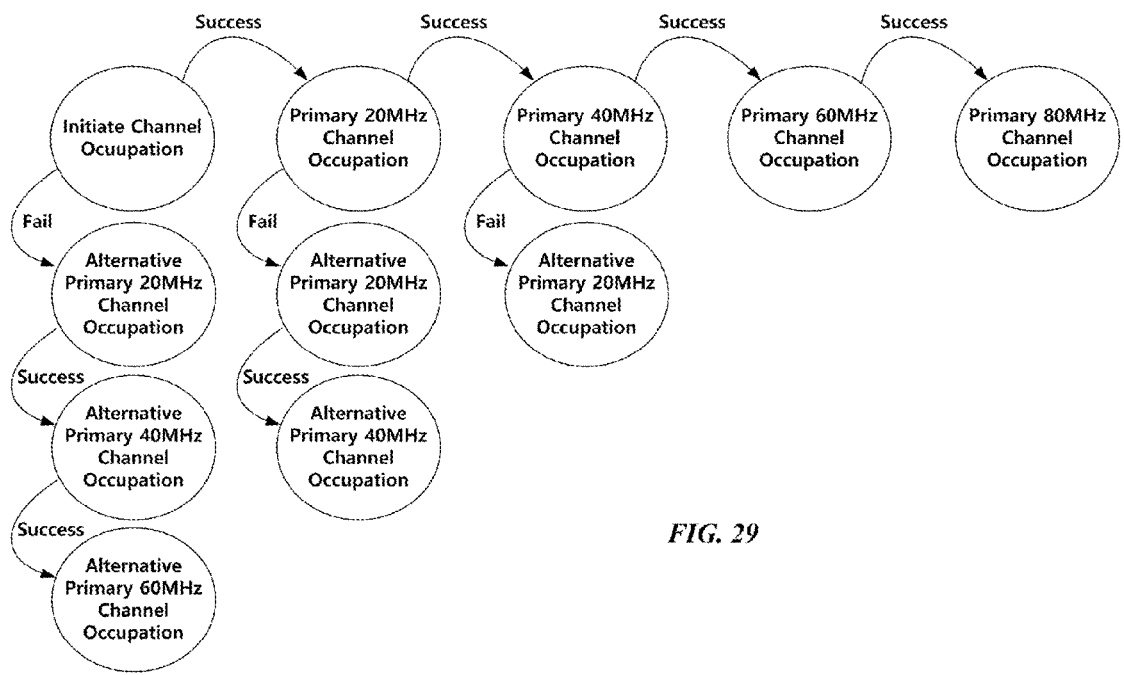
Figure 30:
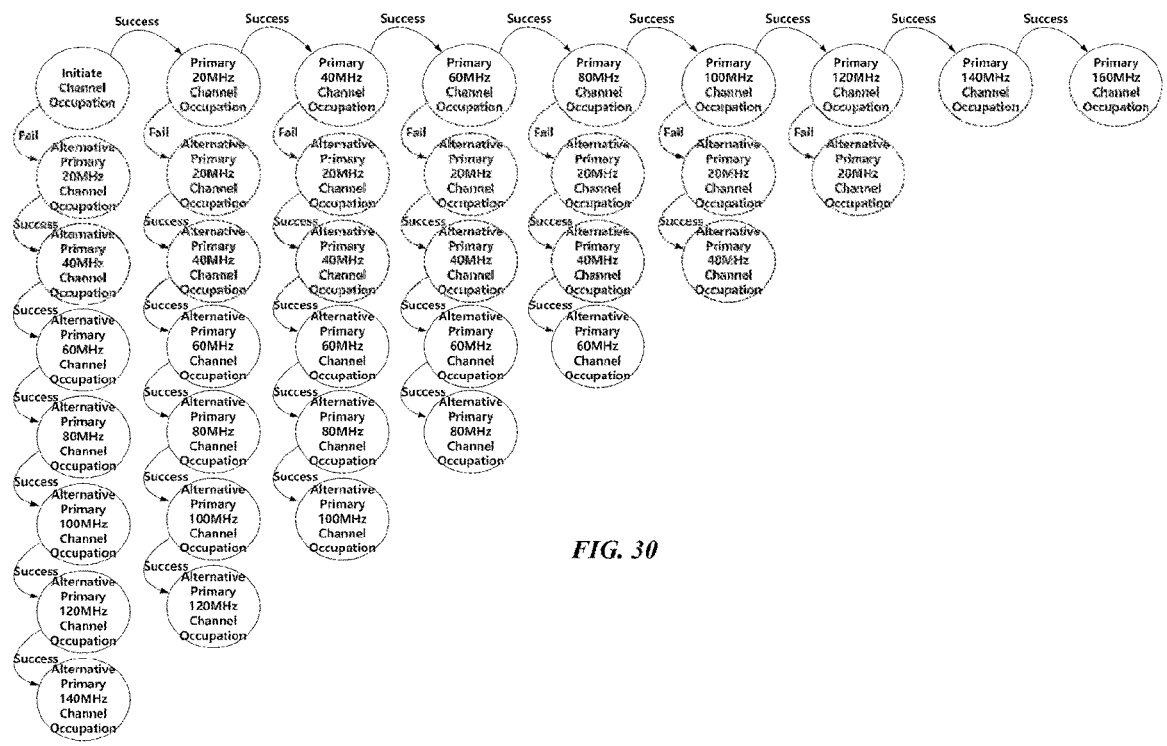

FIGS. 28 to 30 illustrate a channel extension method of a terminal according to the second embodiment of the present invention. According to the second embodiment of the present invention, the terminal can perform the channel extension in units of 20 MHz bandwidth adjacent to the basic primary channel or the alternative primary channel, with the basic primary channel or the alternative primary channel of 20 MHz as a basic bandwidth.

In more detail, referring to FIG. 28, the terminal may perform the extension of the basic channel group and the alternative channel group to 40 MHz, 60 MHz, 80 MHz, 100 MHz, 120 MHz, 140 MHz and 160 MHz by using 20 MHz as a basic bandwidth. However, when the alternative channel group occupation step is performed dependent on the basic channel group occupation step, that is, when the alternative channel group occupation step is performed in a state where the maximum channel bandwidth is not secured in the basic channel group occupation step, the alternative channel group can be extended up to a 140 MHz bandwidth.

FIG. 29 illustrates a process of occupying the basic channel group and the alternative channel group according to the second embodiment of the present invention when the maximum channel bandwidth is 80 MHz. First, when the channel occupation process is initiated, the terminal performs the basic channel group occupation step and attempts to occupy a basic primary 20 MHz channel. If the terminal succeeds in occupying the basic primary 20 MHz channel, the terminal attempts to occupy a basic 40 MHz channel group. If the terminal succeeds in occupying the basic primary 40 MHz channel, the terminal attempts to occupy a basic 60 MHz channel group. If the terminal also succeeds in occupying the basic primary 60 MHz channel, the terminal attempts to occupy a basic 80 MHz channel group.

However, if the terminal fails to occupy the maximum channel bandwidth (i.e., 80 MHz) in the basic channel group occupation step, the terminal performs the alternative channel group occupation step. First, if the terminal fails to occupy the basic primary 20 MHz channel, the terminal may additionally occupy the alternative channel group of 20 MHz, 40 MHz or 60 MHz depending on whether the alternative primary 20 MHz channel and its adjacent channels are available. If the terminal occupies the basic primary 20 MHz channel and fails to occupy additional channel due to busy state of an adjacent channel, the terminal may additionally occupy the alternative channel group of 20 MHz or 40 MHz depending on whether the alternative primary 20 MHz channel and its adjacent channels are available. If the terminal occupies the basic 40 MHz channel group and fails to occupy additional channel due to busy state of an adjacent channel, the terminal may additionally occupy the alternative primary 20 MHz channel depending on whether the alternative primary 20 MHz channel is available.

Meanwhile, if the terminal occupies the basic 60 MHz channel group and fails to occupy additional channel, or if the terminal succeeds in occupying the basic 80 MHz channel group, the terminal does not perform the alternative channel group occupation step. This is because there is no more idle channel if the terminal occupies only the basic 60 MHz channel group, and all the available channels are occupied if the terminal occupies the basic 80 MHz channel group.

Figure 39:
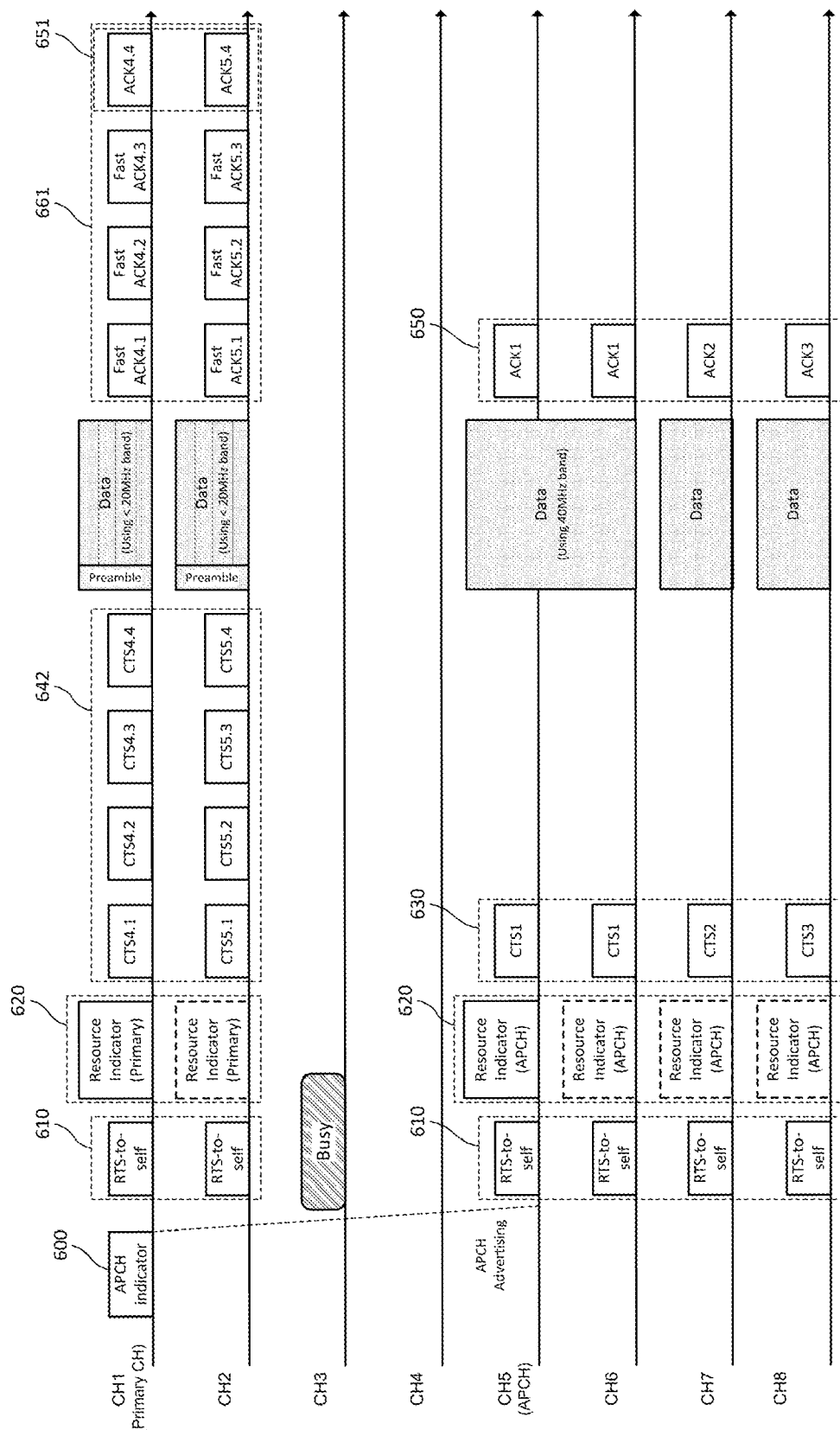

FIG. 39 illustrates a process of occupying the basic channel group and the alternative channel group according to the second embodiment of the present invention when the maximum channel bandwidth is 160 MHz. First, when the channel occupation process is initiated, the terminal performs the basic channel group occupation step and attempts to occupy a basic primary 20 MHz channel. If the terminal succeeds in occupying the basic primary 20 MHz channel, the terminal attempts to occupy a basic 40 MHz channel group. If the terminal succeeds in occupying the basic primary 40 MHz channel, the terminal attempts to occupy a basic 60 MHz channel group. The terminal attempts to occupy the basic 80 MHz, 100 MHz, 120 MHz, 140 MHz and 160 MHz channel groups in the same manner.

However, if the terminal fails to occupy the maximum channel bandwidth (i.e., 160 MHz) in the basic channel group occupation step, the terminal performs the alternative channel group occupation step. First, if the terminal fails to occupy the basic primary 20 MHz channel, the terminal may additionally occupy the alternative channel group of 20 MHz, 40 MHz, 60 MHz, 80 MHz, 100 MHz, 120 MHz or 140 MHz depending on whether the alternative primary 20 MHz channel and its adjacent channels are available. If the terminal occupies the basic primary 20 MHz channel and fails to occupy additional channel due to busy state of an adjacent channel, the terminal may additionally occupy the alternative channel group of 20 MHz, 40 MHz, 60 MHz, 80 MHz, 100 MHz or 120 MHz depending on whether the alternative primary 20 MHz channel and its adjacent channels are available. If the terminal occupies the basic 40 MHz channel group and fails to occupy additional channel due to busy state of an adjacent channel, the terminal may additionally occupy the alternative channel group of 20 MHz, 40 MHz, 60 MHz, 80 MHz or 100 MHz depending on whether the alternative primary 20 MHz channel and its adjacent channels are available. If the terminal occupies the basic 60 MHz channel group and fails to occupy additional channel due to busy state of an adjacent channel, the terminal may additionally occupy the alternative channel group of 20 MHz, 40 MHz, 60 MHz or 80 MHz depending on whether the alternative primary 20 MHz channel and its adjacent channels are available. If the terminal occupies the basic 80 MHz channel group and fails to occupy additional channel due to busy state of an adjacent channel, the terminal may additionally occupy the alternative channel group of 20 MHz, 40 MHz or 60 MHz depending on whether the alternative primary 20 MHz channel and its adjacent channels are available. If the terminal occupies the basic 100 MHz channel group and fails to occupy additional channel due to busy state of an adjacent channel, the terminal may additionally occupy the alternative channel group of 20 MHz or 40 MHz depending on whether the alternative primary 20 MHz channel and its adjacent channels are available. If the terminal occupies the basic 120 MHz channel group and fails to occupy additional channel due to busy state of an adjacent channel, the terminal may additionally occupy the alternative primary 20 MHz channel depending on whether the alternative primary 20 MHz channel is available.

Meanwhile, if the terminal occupies the basic 140 MHz channel group and fails to occupy additional channel, or if the terminal succeeds in occupying the basic 160 MHz channel group, the terminal does not perform the alternative channel group occupation step. This is because there is no more idle channel if the terminal occupies only the basic 140 MHz channel group, and all the available channels are occupied if the terminal occupies the basic 160 MHz channel group.

FIGS. 31 to 35 illustrate various embodiments of a method in which a terminal performs communication using a basic primary channel and an alternative primary channel. A basic primary channel and an alternative primary channel are allocated to the terminal of the present invention according to the aforementioned embodiment, and the terminal performs data transmission and reception using the allocated basic primary channel and the alternative primary channel. In FIGS. 31 to 35, it is assumed that CH1 and CH3 are allocated to the basic primary channel and the alternative primary channel of the terminal, respectively, and a specific allocation method of the alternative primary channel follows the aforementioned embodiments.

Figure 31:
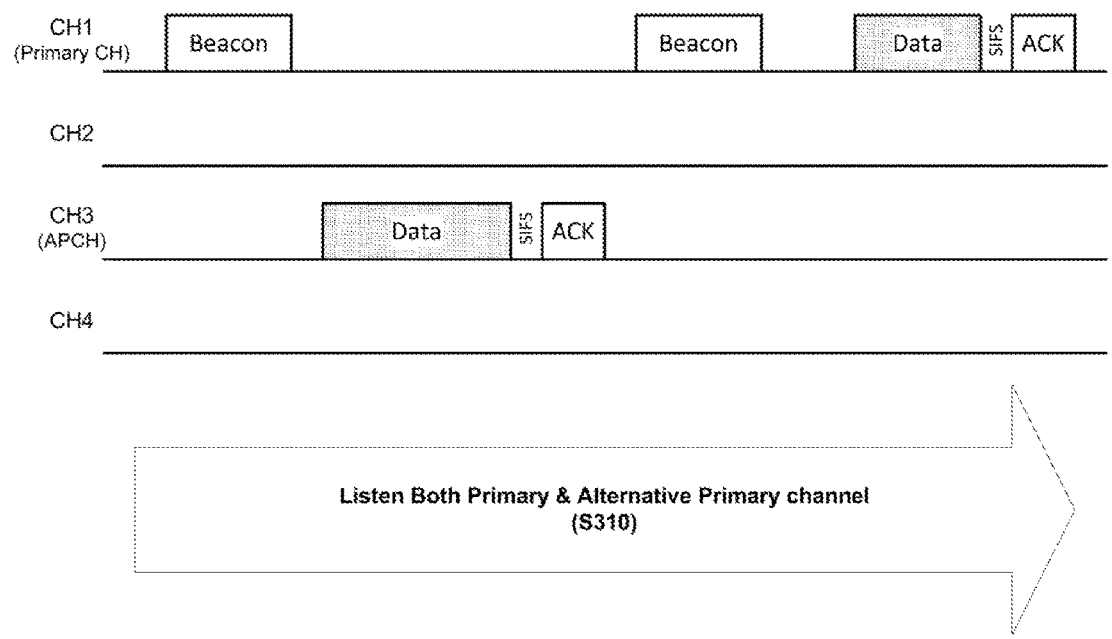
FIGS. 31 to 35 are diagrams illustrating various embodiments of a method in which a terminal performs communication using a basic primary channel and an alternative primary channel.

First, FIG. 31 illustrates a method of a communication based on dual primary channels according to an embodiment of the present invention. In the present invention, the communication based on dual primary channels refers to performing communication using the basic primary channel and the alternative primary channel simultaneously. A terminal to which the basic primary channel and the alternative primary channel are allocated may perform the communication based on dual primary channels through a step S310 of using dual primary channels.

Referring to FIG. 31, the terminal performs scanning simultaneously using the basic primary channel and the alternative primary channel in the step S310 of using dual primary channels. In addition, the terminal may transmit and receive a control frame and a data frame using both the basic primary channel and the alternative primary channel. In this case, the control frame comprises an RTS/CTS frame, an ACK frame, a PS-poll frame, a multi-user uplink transmission trigger frame, and the like, and the present invention is not limited thereto. According to an exemplary embodiment, a STA can receive a beacon frame transmitted from an AP through the basic primary channel, and perform transmitting and receiving the control frame and the data frame through the alternative primary channel apart from the operations in the basic primary channel. In this case, the STA may perform the step S310 of using dual primary channels without any additional setting after exchanging alternative primary channel information with the AP in advance.

Figure 32:
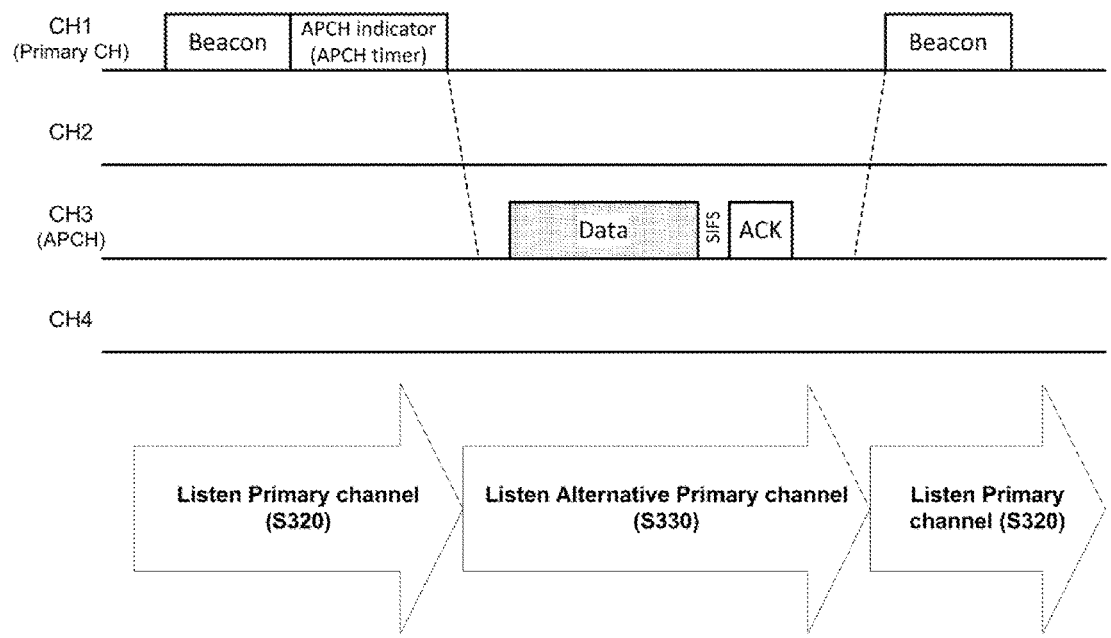
Figure 33:
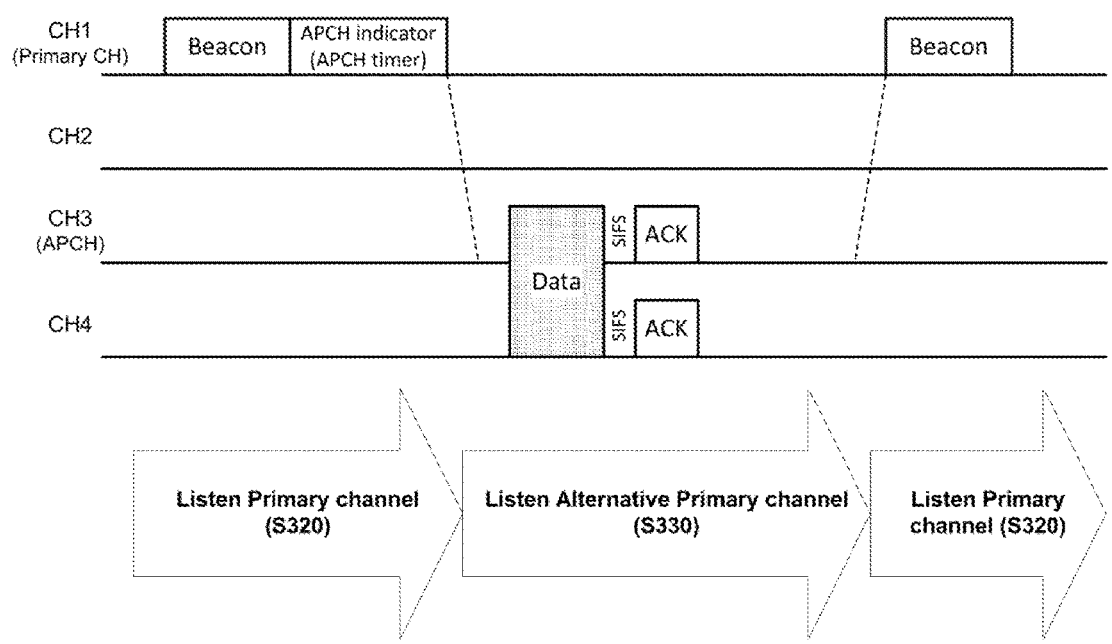

FIG. 32 and FIG. 33 illustrate a method of a communication based on primary channel switching according to another embodiment of the present invention. That is, according to another embodiment of the present invention, a terminal may perform the communication by selectively using the basic primary channel and the alternative primary channel.

Referring to FIG. 32 and FIG. 33, the communication based on primary channel switching includes a step S320 of using basic primary channel and a step S330 of using alternative primary channel. In the step S320 of using basic primary channel, a STA may transmit and receive a control frame and/or a data frame to/from an AP using the basic primary channel. In addition, in the step S320 of using basic primary channel, AP periodically transmits a beacon using the basic primary channel, and STAs in the BSS receive the beacon. According to an embodiment of the present invention, switching from the basic primary channel to the alternative primary channel may be triggered through an alternative primary channel indicator (i.e., APCH indicator). The AP may transmit the alternative primary channel indicator through the basic primary channel. The alternative primary channel indicator may be included in the beacon or transmitted through a frame aggregated with the beacon. Alternatively, the alternative primary channel indicator may be transmitted through a separate frame. A STA which receives the alternative primary channel indicator suspends using the basic primary channel and initiate using the alternative primary channel. In this case, the STA may initiate using the alternative channel group of a wideband based on the above descried bandwidth extension method of the alternative channel group.

The alternative primary channel indicator includes information for the terminal to use the alternative primary channel. For example, the alternative primary channel indicator may include alternative primary channel timer information, identifier information of a target terminal to use the alternative primary channel, and the like. The alternative primary channel timer information represents a duration set for the terminal to use the alternative primary channel, that is, alternative primary channel duration information. In this case, the alternative primary channel timer information may represent the alternative primary channel duration in real time units or in units of a beacon interval. The STA receives the alternative primary channel indicator through the basic primary channel extracts the alternative primary channel timer information from the indicator. Then, the STA performs communication using the alternative primary channel (i.e., step S330) during the alternative primary channel duration based on the extracted timer information.

In the step S330 of using alternative primary channel, the STA transmit and receive a control frame and/or a data frame to/from the AP using the alternative primary channel. In this case, the STA may perform a separate CCA procedure to access the allocated alternative primary channel. The STA may transmit and receive data through the alternative primary channel as shown in FIG. 32, or transmit and receive data through the alternative channel group including the alternative primary channel as shown in FIG. 33. According to an embodiment, the STA performs all operations related to the basic primary channel through the alternative primary channel in the step S330 of using alternative primary channel. When the time designated via the alternative primary channel timer information expires, the STA suspends using of the alternative primary channel (or, the alternative channel group) and switches the using channel to the basic primary channel.

Meanwhile, according to another embodiment of the present invention, the alternative primary channel duration may be determined based on the value delivered via the aforementioned alternative primary channel indicator (i.e., the alternative primary channel timer information), but may be alternatively determined to be a predetermined value of the system. According to an embodiment of the present invention, the alternative primary channel for each terminal is allocated in the association step and the re-association step, and the alternative primary channel indicator may indicate whether to use the alternative primary channel allocated to each terminal. However, according to another embodiment of the present invention, the alternative primary channel indicator may include alternative primary channel information allocated to each terminal. That is, the alternative primary channel indicator may include alternative primary channel information and alternative primary channel timer information allocated to the terminal that uses the alternative primary channel, and the AP may transmit the alternative primary channel indicator to trigger STAs to use the alternative primary channel.

The operation based on the primary channel switching requires time for radio frequency (RF) switching. Thus, switching between the basic primary channel and the alternative primary channel may be performed during a predetermined primary channel switching offset time. That is, the STA that received the alternative primary channel indicator can access the alternative primary channel after the primary channel switching offset time. According to an embodiment, the primary channel switching offset time may be set to a SIFS time, or may be alternatively set to a time less than the SIFS time depending on the system specification.

According to a further embodiment of the present invention, the same alternative primary channel may be allocated to a plurality of STAs. In this case, the alternative primary channel indicator may include the identifier information of all STAs using the alternative primary channel and the alternative primary channel timer information. In this case, each STA to which the same alternative primary channel is allocated may access the alternative primary channel competitively during the alternative primary channel duration indicated by the alternative primary channel timer information. Alternatively, each STA to which the same alternative primary channel is allocated may access the alternative primary channel based on separate scheduling information. If each STA accesses the alternative primary channel based on the separate scheduling information, the alternative primary channel indicator may include the alternative primary channel timer information allocated to each STA. That is, the alternative primary channel indicator may have a frame structure comprising the combination of an association ID (AID) and alternative primary channel timer information of a STA allocated to the corresponding alternative primary channel by the number of STAs allocated to the corresponding alternative primary channel.

Figure 34:
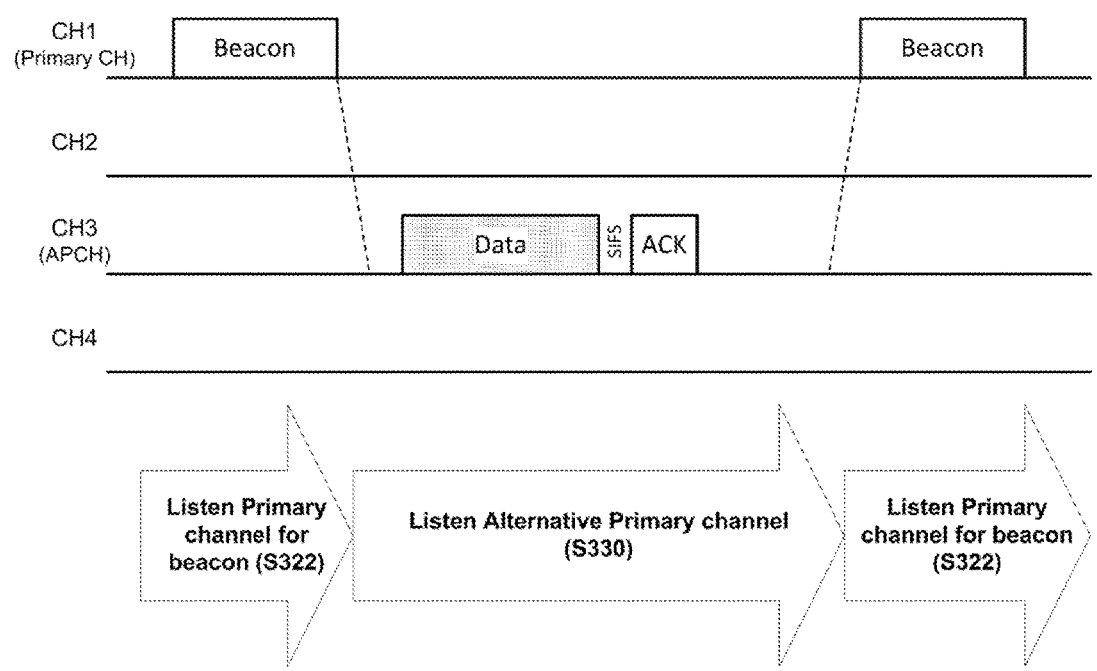

FIG. 34 illustrates a method of communication based on an alternative primary channel according to still another embodiment of the present invention. That is, according to still another embodiment of the present invention, the terminal may perform transmission and reception of all control frames and data frames using the alternative primary channel.

Referring to FIG. 34, the communication based on the alternative primary channel includes a step S322 of using basic primary channel and a step S330 of using alternative primary channel. In the step S322 of using basic primary channel, AP transmits a beacon using the basic primary channel, and STAs in the BSS receive the beacon. When the beacon transmission of the AP is completed, the STA switches to the step S330 of using alternative primary channel, and transmits and receives a control frame and/or a data frame to/from the AP using the alternative primary channel. That is, the STA to which the alternative primary channel is allocated accesses the basic primary channel only at the beacon transmission timing of the AP, and performs channel access and data transmission operations through the alternative primary channel allocated to the corresponding STA during the remaining time.

As described above, the terminal performing the communication based on the alternative primary channel basically performs data transmission and reception using the alternative primary channel, and periodically switches to the basic primary channel for each beacon interval to receive the beacon. Accordingly, the alternative primary channel duration is determined as a time obtained by subtracting the time required for transmitting the beacon from the beacon interval. If a separate primary channel switching offset time is set for the primary channel switching, the alternative primary channel duration may be determined as a time obtained by subtracting the primary channel switching offset time from the beacon interval.

According to an embodiment of the present invention, when the communication based on the alternative primary channel is performed, candidate channels of the alternative primary channel allocated to a terminal may include the basic primary channel as well as the secondary channels. In this case, terminals to which the basic primary channel is allocated as the alternative primary channel can perform data transmission and reception using the basic primary channel without channel switching. According to a further embodiment of the present invention, when the transmission time of data transmitted through the alternative primary channel exceeds the beacon interval, the terminal that receives the corresponding data may skip the step S322 of using basic primary channel and continuously perform the step S330 of using alternative primary channel.

Figure 35:
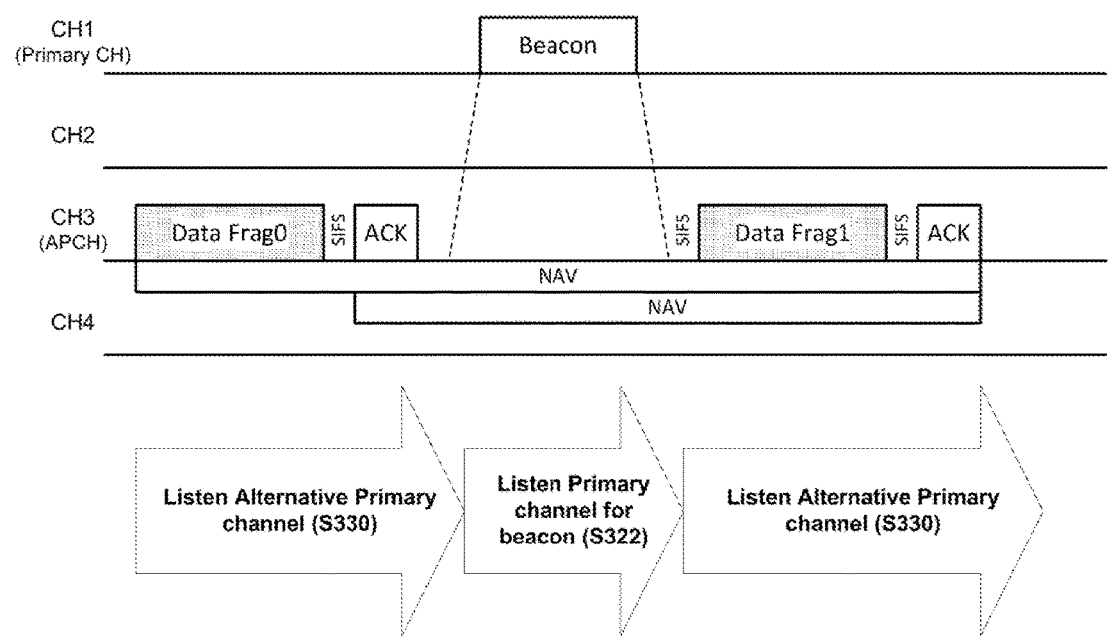

FIG. 35 illustrates a method of performing data transmission and reception by performing data fragmentation when using the alternative primary channel set according to an embodiment of the present invention. In the exemplary embodiment of FIG. 35, the same or corresponding parts as those of the exemplary embodiments of FIGS. 32 to 34 will be omitted.

STAs performing the communication based on primary channel switching or the communication based on the alternative primary channel should periodically switch to the basic primary channel to receive beacons transmitted by the AP. In the conventional communication method based on the basic primary channel, if the data transmission time of the terminal becomes long, the transmission of the beacon is delayed. On the other hand, in the communication method according to the aforementioned embodiments, since the channel through which the beacon is transmitted and the channel through which data is transmitted and received are different, exchange of the data frame and ACK frame between the STA and the AP should be terminated before the next beacon transmission timing.

Therefore, according to the embodiment of the present invention, when the length of data to be transmitted through the alternative primary channel or the alternative channel group exceeds the next beacon transmission timing, the terminal may transmit the corresponding data by dividing into a plurality of sub-data. According to an embodiment, if the length of data to be transmitted is longer than the alternative primary channel duration, the terminal may transmit the corresponding data by dividing into a plurality of subframes.

FIG. 35 shows a situation where data transmission of a terminal cannot be completed before a scheduled beacon transmission timing. Accordingly, the terminal divides the data to be transmitted into a first subframe (i.e., Data Frag0) and a second subframe (i.e., Data Frag1) and transmits the divided data. In this case, the terminal adjusts the length of each subframe so that transmissions of each subframe and corresponding ACK frame can be performed within the alternative primary channel duration. According to an embodiment, the length of each subframe may be set to less than or equal to a value obtained by subtracting 'SIFS+ length of the ACK frame' from the alternative primary channel duration.

After dividing the data to be transmitted into a plurality of subframes, the terminal sequentially performs data transmission on the alternative primary channel from the first subframe (i.e., Data Frag0). The terminal transmits the subframe through the step S330 of using alternative primary channel and receives the corresponding ACK frame. When the beacon transmission timing is reached, the terminal switches to the step S322 of using basic primary channel, and the transmission of beacon by the AP is performed through the basic primary channel. When the transmission of beacon by the AP is completed, the terminal switches back to the step S330 of using alternative primary channel and transmits the remaining divided subframes. According to an embodiment of the present invention, when transmitting a subframe following the first subframe (i.e., Data Frag0), the terminal may perform CCA for SIFS time after the primary channel switching, and transmit the next subframe (e.g., the second frame) when the channel is determined to be idle.

According to a further embodiment of the present invention, when data is divided into a plurality of subframes and transmitted, the terminal may set a value of the duration field of each subframe based on a time until the transmission of the last subframe and the reception of the corresponding ACK frame are completed. That is, the value of the duration field of each subframe may be set based on a sum of a time required for transmitting each subframe, a time required for transmitting a ACK frame corresponding to each subframe, a plurality of SIFS times between the transmission of each subframe and ACK frame, a primary channel switching offset time, and a time required for transmitting a beacon. By setting the value of the duration field of each subframe as above, the network allocation vector (NAV) of the adjacent terminals can be set until the transmission of the last subframe is completed.

FIGS. 36 to 43 illustrate various embodiments for providing data transmission opportunities to multiple users. In order to increase the efficiency of frequency resources, it is possible to perform simultaneously transmitting data to a plurality of terminals by using orthogonal frequency division multiple access (OFDMA). According to an embodiment of the present invention, the aforementioned alternative primary channel and alternative channel group utilization techniques can be combined with the OFDMA technique to support data transmission for a large number of users in a wideband. However, when data transmission for the large number of users is performed without a separate protection means, the probability of transmission failure increases due to interference by other users or APs nearby. Therefore, there is a need for a method for guaranteeing transmission opportunities for each terminal and a method for blocking interference by legacy terminals as well as non-legacy terminals.

A basic primary channel and an alternative primary channel are allocated to a terminal according to the aforementioned embodiment, and the terminal may perform multi-user transmission using at least one of the basic primary channel and the alternative primary channel. Although the following embodiments assume that the terminal performs the communication based on dual primary channel, the corresponding embodiments can be applied similarly to the channel group used by the terminal even when the communication based on primary channel switching or the communication based on alternative primary channel are used. In the embodiments of FIGS. 36 to 43, it is assumed that CH1 and H5 are allocated to the basic primary channel and the alternative primary channel of the terminal, respectively, and a specific allocation method of the alternative primary channel follows the aforementioned embodiments. In addition, the terminal may transmit data through a wideband of 20 MHz or more, or may transmit data through a subband of less than 20 MHz.

Figure 36:
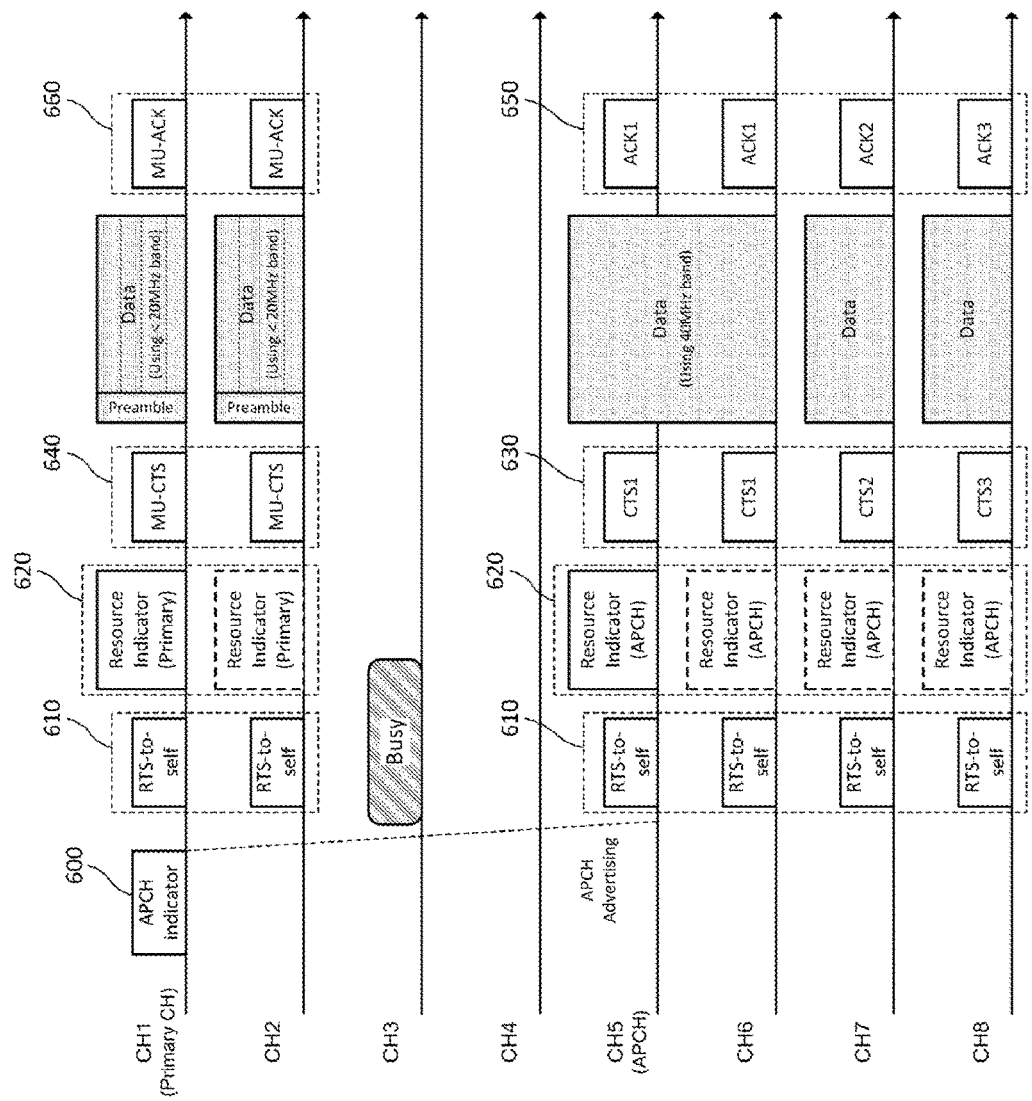
FIGS. 36 to 43 illustrate various embodiments for providing data transmission opportunities to multiple users.

FIG. 36 illustrates the first embodiment for providing data transmission opportunities to multiple users. According to an embodiment of the present invention, data transmission opportunities of multiple users can be allocated using a predetermined control frame.

First, the AP may transmit a message triggering the use of an alternate primary channel. According to an embodiment, the alternate primary channel indicator 600 described above may be utilized as the triggering message. The AP may transmit the alternate primary channel indicator 600 through the basic primary channel. The alternative primary channel indicator 600 may be included in the beacon or transmitted through a frame aggregated with the beacon. Alternatively, the alternative primary channel indicator 600 may be transmitted through a separate frame. The alternate primary channel indicator 600 may provide information about which channel is used as an alternate primary channel and which STA the alternate primary channel is allocated to, as advertisement information for the alternate primary channel. Once the alternate primary channel is set, each STA will sense and listen to both the basic primary channel and the alternate primary channel.

Next, the AP transmits a control frame to guarantee a multi-user transmission opportunity. According to an embodiment, the AP may transmit an RTS-to-self frame 610 to guarantee the multi-user transmission opportunity. The RTS-to-self frame 610 has a frame format of RTS, and a receiver address and a transmitter address are set to be the same. The STAs in the BSS may receive the RTS-to-self frame 610 transmitted by the AP. If the STA receiving the RTS-to-self frame 610 participates in the multi-user data transmission, the STA is ready to receive the resource indicator 620, which will be described later. However, if the STA receiving the RTS-to-self frame 610 does not participate in the multi-user data transmission, the STA sets a NAV based on the duration field information of the RTS-to-self frame 610. In FIG. 36, the RTS-to-self frame 610 is shown as a control frame transmitted by the AP to guarantee the multi-user transmission opportunity, but the present invention is not limited thereto. That is, the AP may transmit another type of modified frame having a format of the RTS frame instead of the RTS-to-self.

Next, the AP transmits a resource indicator 620. The resource indicator 620 indicates resource (i.e., transmitting channel) allocation information for the terminals using the corresponding channel and the corresponding channel group. In the present invention, the resource may represent a specific channel of 20 MHz band, a specific subband channel of band less than 20 MHz, a specific channel group of 20 MHz band or more, and the like. The AP according to the embodiment of the present invention may transmit the resource indicator 620 for each of the basic primary channel and the alternative primary channel. The resource indicator 620 transmitted through the basic primary channel indicates resource allocation information for the basic channel group and the resource indicator 620 transmitted through the alternative primary channel indicates resource allocation information for the corresponding alternative primary channel or the alternative channel group. In this case, the AP may transmit the resource allocation information for the idle channel among all the channels through the resource indicator 620.

More specifically, according to the embodiment of FIG. 36, OFDMA is performed for a plurality of STAs in units of a subband in the basic channel group including CH1 and CH2, and OFDMA is performed for a plurality of STAs in units of 20 MHz band or more in the alternative channel group including CH5 to CH8. In other words, data is transmitted to STA1 through 40 MHz band in which CH5 and CH6 are aggregated, and data is transmitted to STA2 and STA3 through CH7 and CH8 of 20 MHz band, respectively. Therefore, the AP transmits the resource indicator 620 having the resource allocation information of CH1 and CH2 through the basic primary channel CH1, and transmits the resource indicator 620 having the resource allocation information of CH5 to CH8 through the alternative primary channel CH5.

When a resource is allocated via the resource indicator 620, each STA to which the resource is allocated transmits a resource allocation identification frame through the allocated channel or channel group. According to an embodiment, each STA may transmit a CTS frame 630 to the AP as the resource allocation identification frame. In this case, a STA to which a subband channel of less than 20 MHz is allocated may transmit a newly defined multi-user CTS (MU-CTS) frame 640 because it cannot transmit a legacy formatted CTS frame 630 through 20 MHz band. The MU-CTS frame 640 is transmitted through the 20 MHz band and may include resource allocation identification information for multiple users. The AP receives the resource allocation identification frame transmitted by each STA.

The AP receiving the resource allocation identification frame transmits data through each allocated channel. In this case, the AP may transmit data to the STAs whose transmission of the resource allocation identification frame is confirmed. The STA receives data from the AP and transmits an ACK frame 650 corresponding to the received data. If the data is received through a subband channel of less than 20 MHz, the STA transmits a newly defined multi-user ACK (MU-ACK) frame 660 since it cannot transmit a legacy formatted ACK frame 650 through the 20 MHz band. The MU-ACK frame 660 is transmitted through 20 MHz band and may include ACK information of multiple users. The AP receives the ACK frame 650 or the MU-ACK frame 660 transmitted by each STA.

Figure 37:
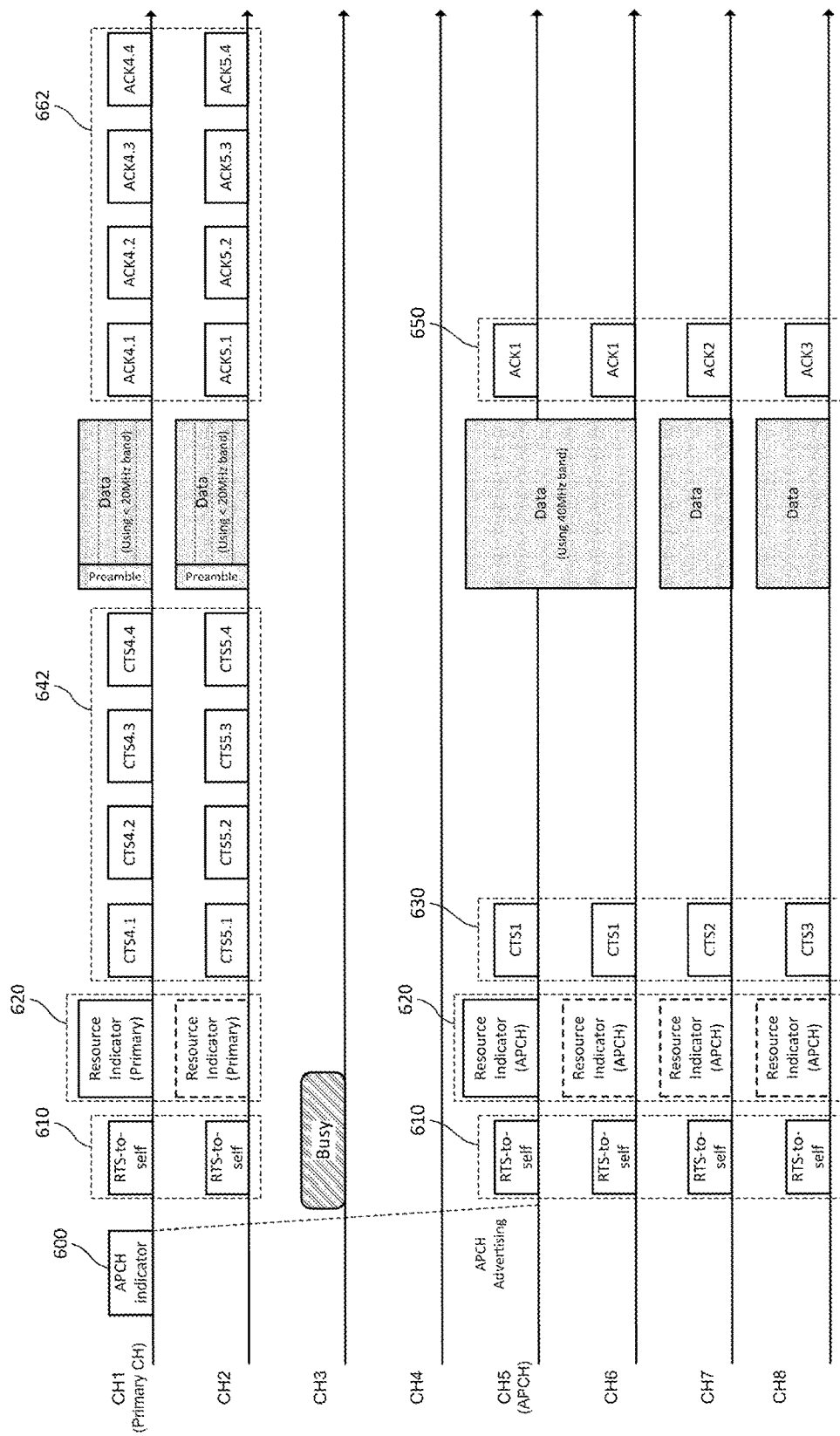
Figure 38:
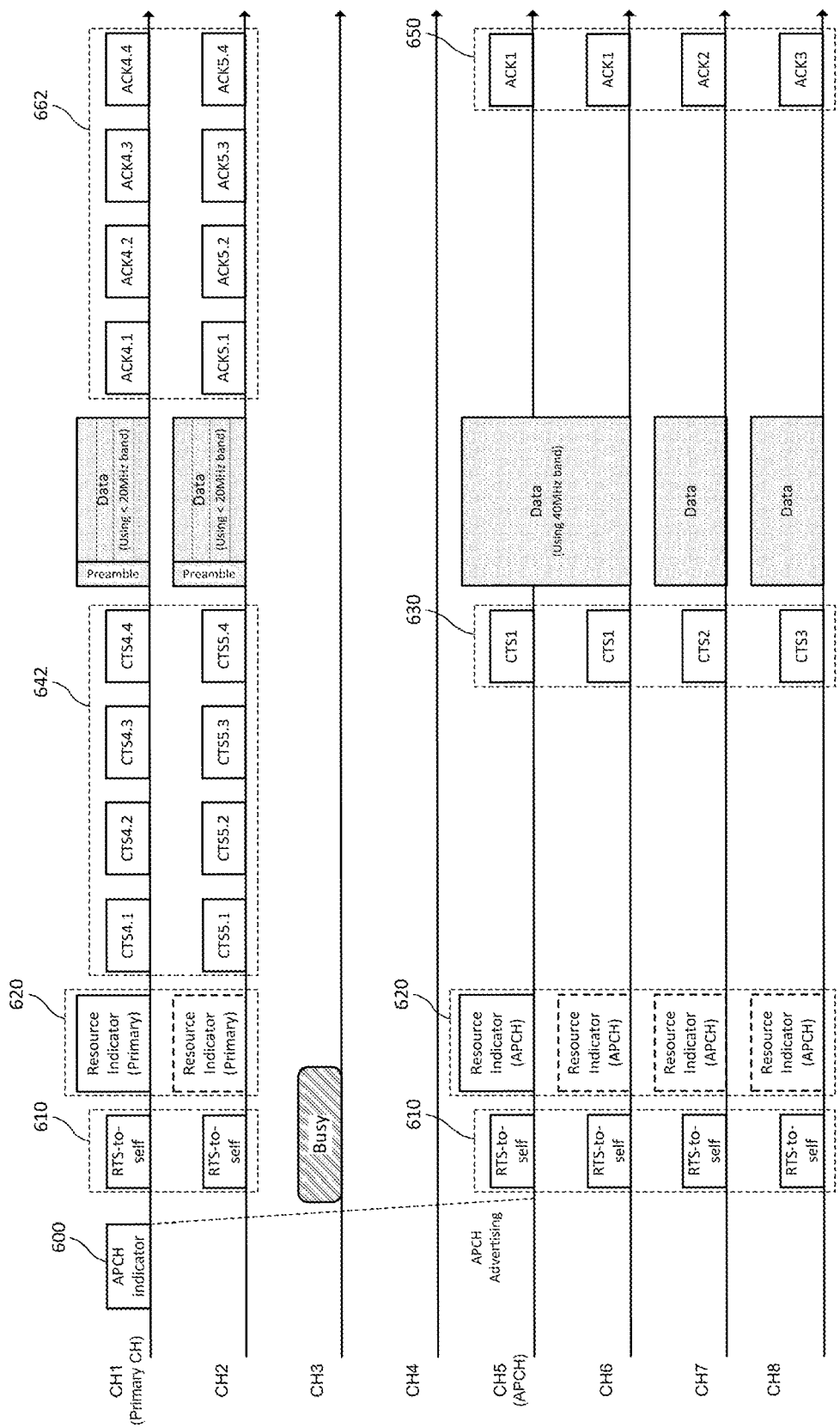

FIG. 37 and FIG. 38 illustrate the second embodiment for providing data transmission opportunities to multiple users. According to the second embodiment of the present invention, STAs to which a subband channel of less than 20 MHz is allocated as the resource implement the aforementioned resource allocation identification frame and the ACK frame via sequential CTS frames and sequential ACK frames, respectively. In the exemplary embodiment of FIGS. 37 and 38, the same or corresponding parts as those of the exemplary embodiment of FIG. 36 will be omitted.

First, STAs to which a subband channel of less than 20 MHz is allocated as the resource may transmit a cascade CTS frame 642 as a resource allocation identification frame in response to receipt of the resource indicator 620. The cascade CTS frame 642 consists of a plurality of CTS frames sequentially transmitted by a plurality of STAs. In this case, each CTS frame constituting the cascade CTS frame 642 includes resource allocation identification information of each STA, and may be set in the same format as the legacy CTS frame. Each STA to which the resource is allocated through the resource indicator 620 transmits the cascade CTS frame 642 through a channel of 20 MHz band to which the allocated subband channel belongs.

The transmission time point of the CTS frame of each STA in the cascade CTS frame 642 can be determined based on the information extracted from the resource indicator 620. The STAs to which the resource is allocated may obtain information to determine the number of CTS frames constituting the cascade CTS frame 642, the transmission time of the CTS frame of the corresponding STA, and the like, from the resource indicator 620. In addition, each STA can determine the time at which data is transmitted based on the information extracted from the resource indicator 620. The AP receives the cascade CTS frame 642 transmitted by a plurality of STAs, and transmits data through the subband channels allocated to the respective STAs corresponding thereto.

When the cascade CTS frame 642 is transmitted, adjacent terminals to which the resource is not allocated set the NAV. In this case, since the cascade CTS frame 642 has the format of the legacy CTS frame, the legacy terminals as well as the non-legacy terminal can set the NAV.

In addition, the STAs receiving data through the subband channel can transmit a cascade ACK frame 662 in response thereto. The cascade ACK frame 662 consists of a plurality of ACK frames sequentially transmitted by a plurality of STAs. In this case, each ACK frame constituting the cascade ACK frame 662 includes ACK information of each STA, and may be set in the same format as the legacy ACK frame. Each STA that receives data through a subband channel transmits the cascade ACK frame 662 through a channel of 20 MHz band to which the corresponding subband channel belongs.

Meanwhile, STAs to which a channel of 20 MHz band or more is allocated may participate in the multi-user data transmission using the CTS frame 630 and the ACK frame 650 of the legacy format as described above with reference to FIG. 36. As shown in FIG. 37, the CTS frame 630 and the ACK frame 650 may be transmitted simultaneously with the first frame of the cascade CTS frame 642 and the first frame of the cascade ACK frame 662, respectively. However, according to another embodiment, as shown in FIG. 38, the ACK frame 650 may be transmitted simultaneously with the last frame of the cascade ACK frame 662 to synchronize the end of transmission.

Figure 40:
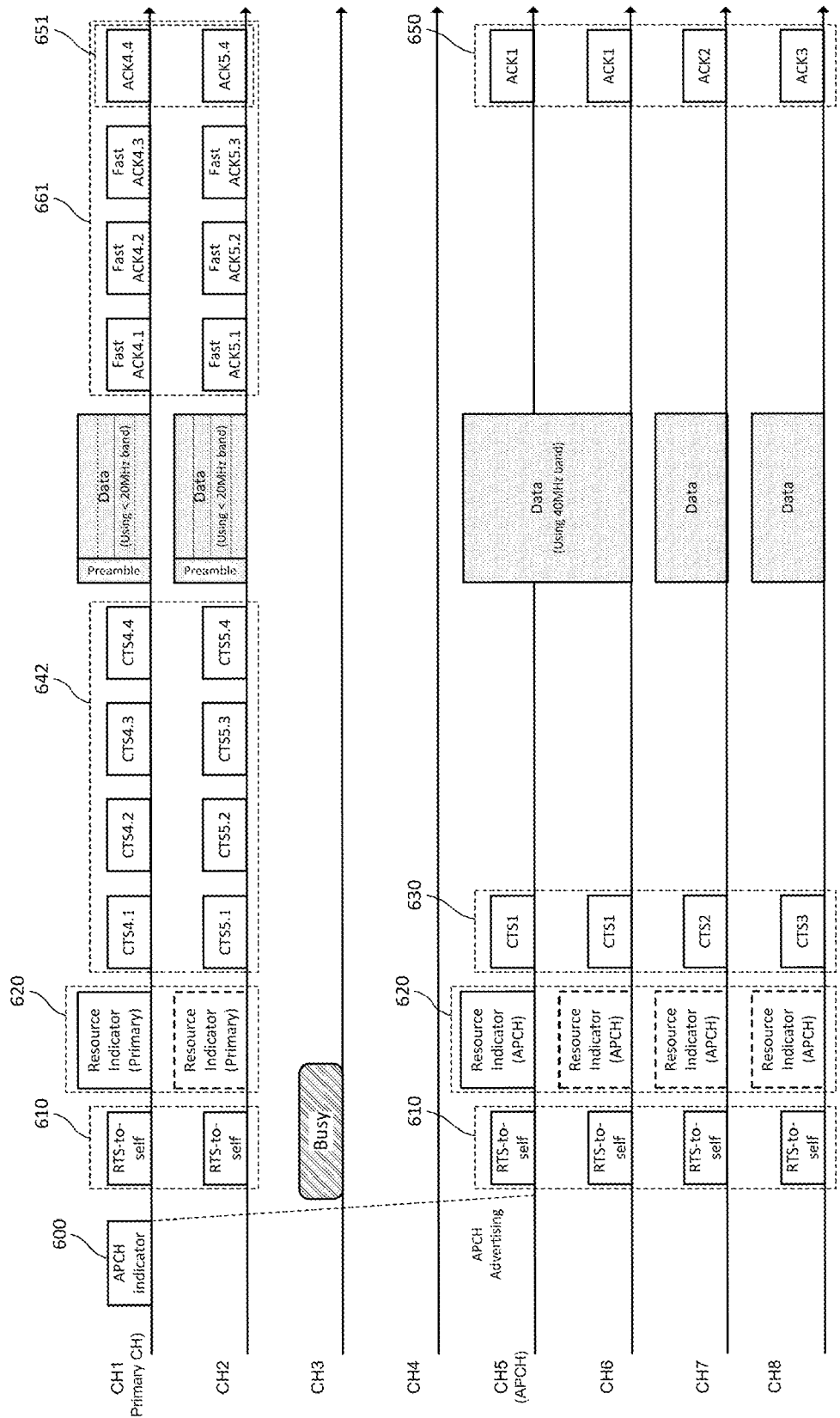

FIG. 39 and FIG. 40 illustrate the third embodiment for providing data transmission opportunities to multiple users.

According to the third embodiment of the present invention, STAs receiving data through a subband channel may transmit a cascade ACK frame 661 composed of a simplified ACK frame. In the exemplary embodiment of FIGS. 39 and 40, the same or corresponding parts as those of the exemplary embodiments of FIGS. 36 to 38 will be omitted.

Since the ACK frame corresponding to the data transmitted through the subband channel does not need to be received by the legacy terminals, the STAs can reduce the overhead by constructing the cascade ACK frame 661 by using the simplified ACK frame. According to an embodiment, the simplified ACK frame may be set at the same rate as the rate of the data frame. Also, the simplified ACK frame may be configured in a form in which the legacy preamble of the PLCP protocol data unit (PPDU) is omitted.

According to an embodiment, the simplified ACK frame may be used for all frames constituting the cascade ACK frame 661. According to another embodiment, the last frame 651 of the cascade ACK frame 661 may be set to a legacy ACK frame format. In this case, the termination information of the multi-user transmission may be transmitted, since the last frame 651 is transmitted by the legacy ACK frame.

As described above, the STAs to which a channel of 20 MHz band or more is allocated may participate in the multi-user data transmission using the CTS frame 630 and the ACK frame 650 of the legacy format. As shown in FIG. 39, the CTS frame 630 and the ACK frame 650 may be transmitted simultaneously with the first frame of the cascade CTS frame 642 and the first frame of the cascade ACK frame 661, respectively. However, according to another embodiment, as shown in FIG. 40, the ACK frame 650 may be transmitted simultaneously with the last frame 651 of the cascade ACK frame 661 to synchronize the end of transmission.

Figure 41:
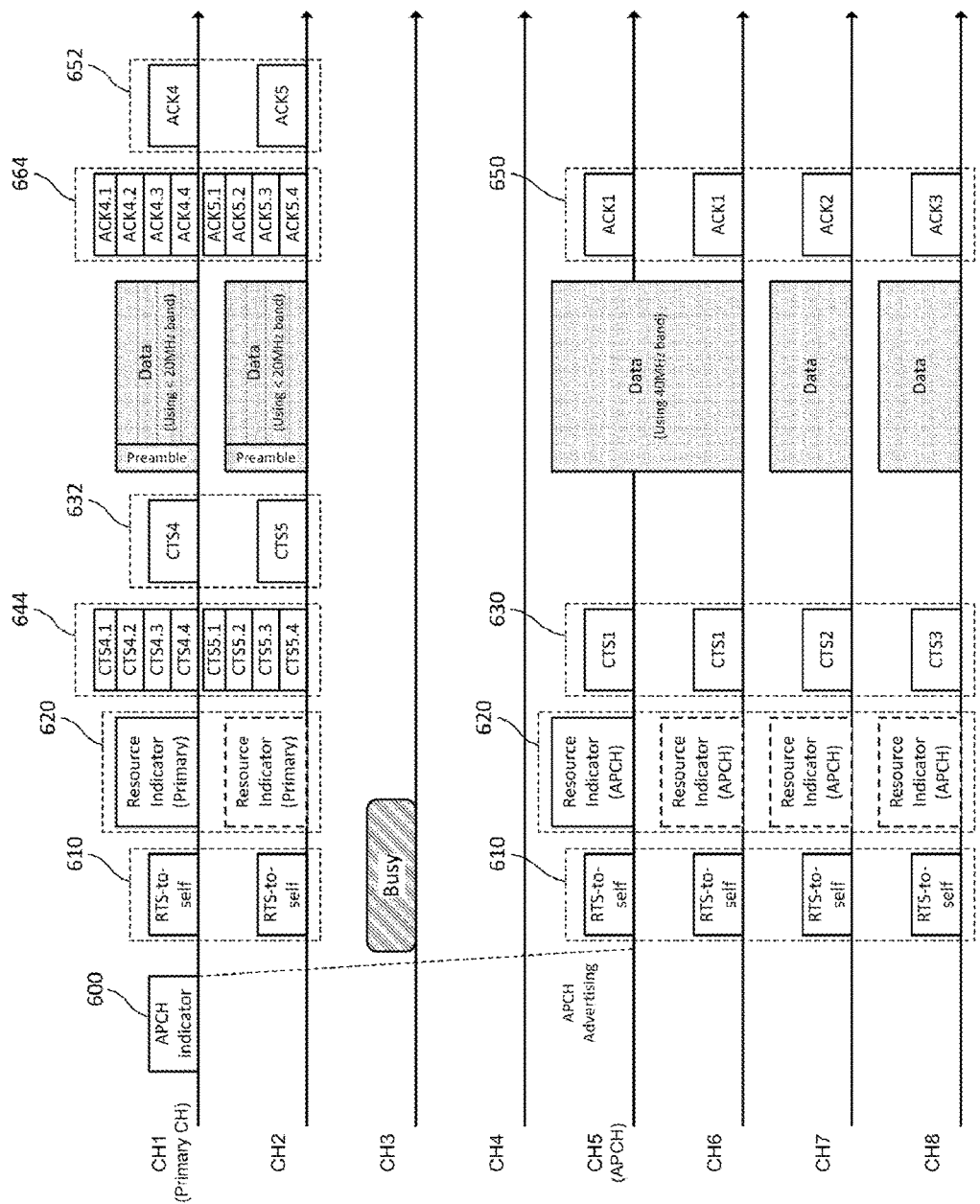
Figure 42:
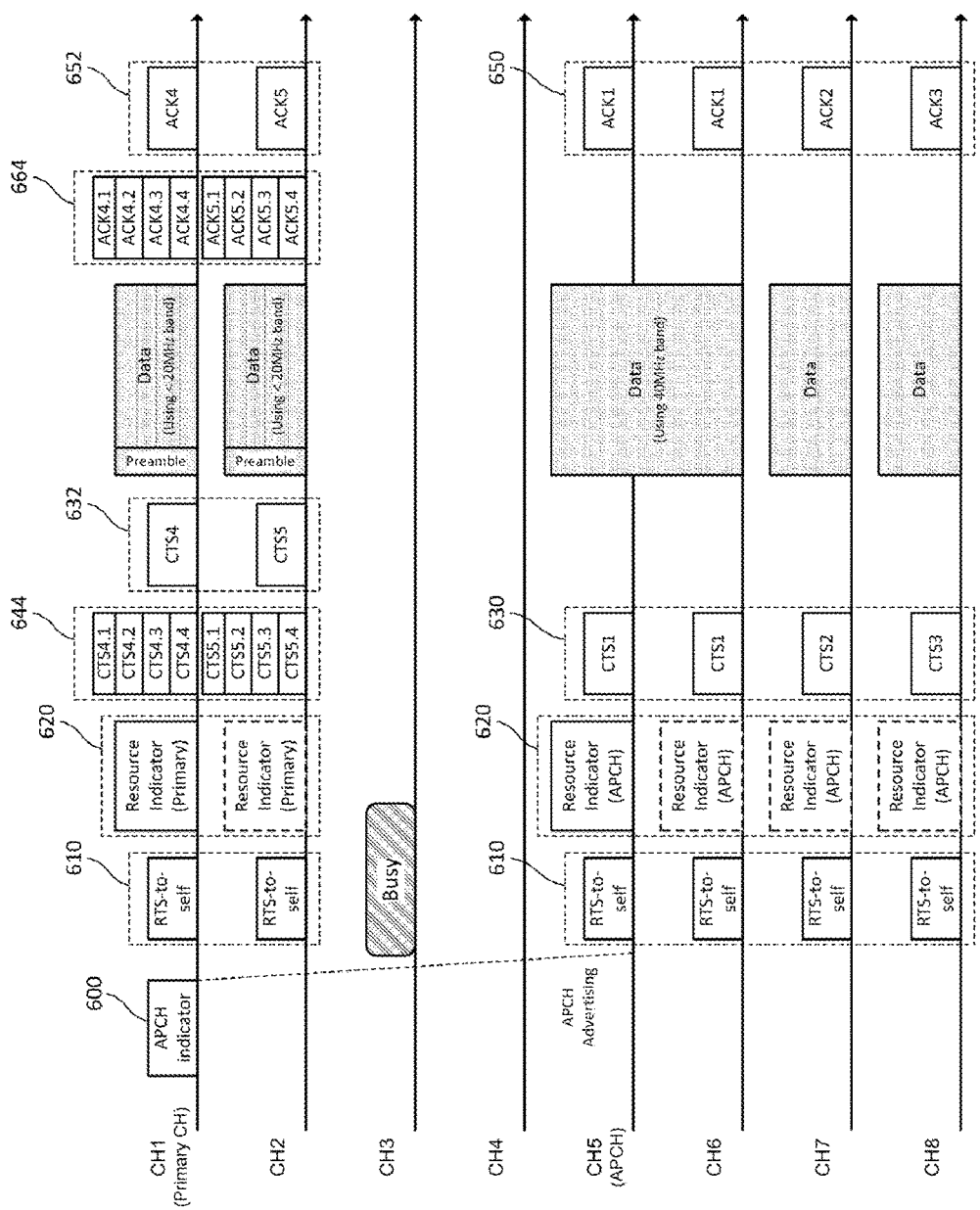
Figure 43:
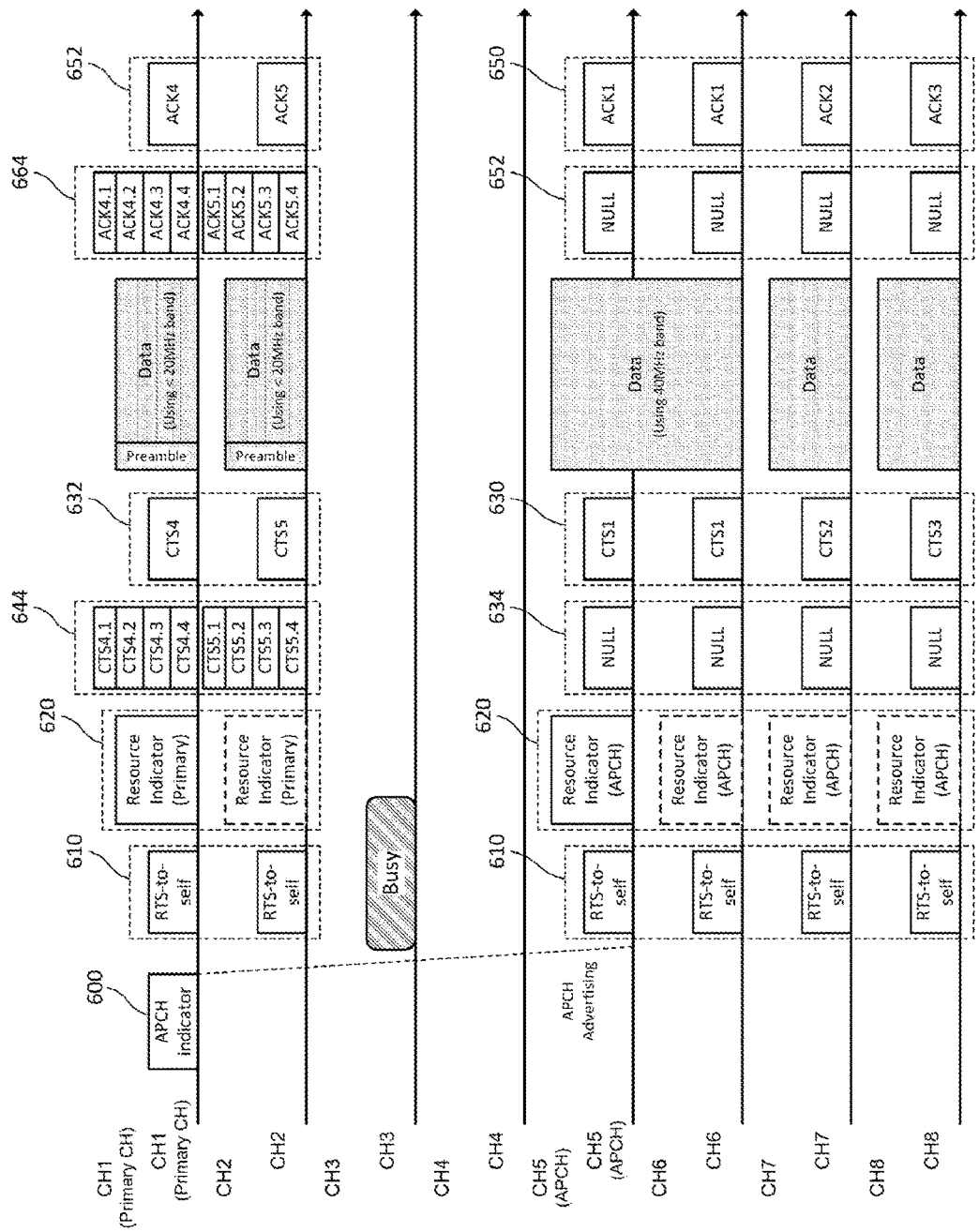

FIGS. 41 to 43 illustrate the fourth embodiment for providing data transmission opportunities to multiple users. According to the fourth embodiment of the present invention, STAs to which a subband channel of less than 20 MHz is allocated as the resource implement the resource allocation identification frame and the ACK frame as a subband CTS frame and a subband ACK frame, respectively. In the exemplary embodiment of FIGS. 41 to 43, the same or corresponding parts as those of the exemplary embodiments of FIGS. 36 to 40 will be omitted.

First, STAs to which a subband channel of less than 20 MHz is allocated may transmit a subband CTS frame 644 as the resource allocation identification frame in response to reception of the resource indicator 620. In this case, each STA can transmit the subband CTS frame 644 through the subband channel allocated to the corresponding STA. On the other hand, the subband CTS frame 644 may not be recognizable by the legacy terminals. Accordingly, each STA may support the NAV setting of the legacy terminal by transmitting a CTS frame 632 of a legacy format once again after the subband CTS frame 644 is transmitted. According to an embodiment, the CTS frame 632 transmitted simultaneously through the same channel may be set to have the same field values. The AP receives the subband CTS frame 644 transmitted by a plurality of STAs, and transmits data through a subband channel allocated to each STA corresponding thereto.

The STAs receiving data through the subband channel transmit a subband ACK frame 664 corresponding thereto. In this case, each STA may transmit the subband ACK frame 664 through the subband channel allocated to the corresponding STA. According to a further embodiment of the present invention, each STA may transmit an ACK frame 652 of a legacy format once again after the subband ACK frame 664 is transmitted to inform the end of the transmission. According to an embodiment, the ACK frame 652 transmitted simultaneously through the same channel may be set to have the same field values.

As described above, the STAs to which a channel of 20 MHz band or more is allocated can participate in the multi-user data transmission using the CTS frame 630 and the ACK frame 650 of the legacy format. As shown in FIG. 41, the CTS frame 630 and the ACK frame 650 may be transmitted simultaneously with the subband CTS frame 644 and the subband ACK frame 664, respectively. However, according to another embodiment, as shown in FIG. 42, the ACK frame 650 may be transmitted simultaneously with the ACK frame 652, which is additionally transmitted by the STAs to which the subband channel is allocated, to synchronize the end of transmission.

Meanwhile, according to a further embodiment of FIG. 43, the CTS frame 630 may also be transmitted simultaneously with the CTS frame 632, which is additionally transmitted by the STAs to which the subband channel is allocated. In this case, STAs transmitting the CTS frame 630 and the ACK frame 650 in the legacy format may transmit NULL frames 634 and 652 respectively while the subband CTS frame 644 and the subband ACK frame 664 are transmitted, thereby maintaining the corresponding channel busy.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

MODE FOR INVENTION

As above, related features have been described in the best mode.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal, the terminal comprising:
    a transceiver configured to transmit and receive a wireless signal; and
    a processor configured to control an operation of the wireless communication terminal,
    wherein the processor is configured to:
    obtain information of a basic primary channel of a basic service set (BSS) with which the terminal is associated, wherein the basic primary channel is set commonly for each terminal in the BSS,
    obtain information of an alternative primary channel set for the terminal,
    wherein the alternative primary channel is set individually for each terminal in the BSS and the alternative primary channel does not overlap with the basic primary channel, and
    perform data transmission and reception selectively using the basic primary channel and the alternative primary channel,
    wherein the processor is further configured to:
    receive an alternative primary channel indicator through the basic primary channel, and
    switch a using channel of the terminal from the basic primary channel to the alternative primary channel in response to the reception of the alternative primary channel indicator.

2. The terminal of claim 1, wherein the processor is further configured to:
    transmit and receive a control frame and a data frame using both the basic primary channel and the alternative primary channel.

3. The terminal of claim 2, wherein the control frame comprises at least one of a request to send frame, a clear to send frame, an acknowledge frame, a power save poll frame, and a multi-user uplink transmission trigger frame.

4. The terminal of claim 1, wherein the alternative primary channel indicator comprises alternative primary channel duration information set for the terminal to use the alternative primary channel.

5. The terminal of claim 4, wherein the processor is further configured to:

perform data transmission and reception using the alternative primary channel during the alternative primary channel duration, and when the alternative primary channel duration expires, suspend using of the alternative primary channel and switch the using channel to the basic primary channel.

6. The terminal of claim 4, wherein the alternative primary channel duration is determined based on a time obtained by subtracting a time required for transmitting a beacon from a beacon transmission interval of a base wireless communication terminal.

7. The terminal of claim 1,

A wireless communication terminal, the terminal comprising:

a transceiver configured to transmit and receive a wireless signal; and a processor configured to control an operation of the wireless communication terminal, wherein the processor is configured to:

obtain information of a basic primary channel of a basic service set (BSS) with which the terminal is associated, wherein the basic primary channel is set commonly for each terminal in the BSS, obtain information of an alternative primary channel set for the terminal, wherein the alternative primary channel is set individually for each terminal in the BSS and the alternative primary channel does not overlap with the basic primary channel, and perform communication using at least one of the basic primary channel and the alternative primary channel, wherein the processor is further configured to:

transmit and receive a control frame and a data frame using the alternative primary channel, and receive a beacon by periodically switching to the basic primary channel for each beacon transmission interval of the base wireless communication terminal.

8. A wireless communication method of a terminal, the method comprising:

obtaining information of a basic primary channel of a basic service set (BSS) with which the terminal is associated, wherein the basic primary channel is set commonly for each terminal in the BSS;

obtaining information of an alternative primary channel set for the terminal, wherein the alternative primary channel is set individually for each terminal in the BSS and the alternative primary channel does not overlap with the basic primary channel; and performing data transmission and reception selectively using the basic primary channel and the alternative primary channel, wherein the method further comprises:

receiving an alternative primary channel indicator through the basic primary channel; and switching a using channel of the terminal from the basic primary channel to the alternative primary channel in response to the reception of the alternative primary channel indicator.

* * * * *